United States Patent
Moon et al.

(10) Patent No.: US 10,333,200 B2
(45) Date of Patent: Jun. 25, 2019

(54) PORTABLE DEVICE AND NEAR FIELD COMMUNICATION CHIP

(71) Applicants: Byeong-Taek Moon, Seoul (KR); Jae-Suk Lee, Suwon-si (KR); Il-Jong Song, Suwon-si (KR); Young-Ki Lee, Seoul (KR); Yo-Han Jang, Seoul (KR)

(72) Inventors: Byeong-Taek Moon, Seoul (KR); Jae-Suk Lee, Suwon-si (KR); Il-Jong Song, Suwon-si (KR); Young-Ki Lee, Seoul (KR); Yo-Han Jang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 321 days.

(21) Appl. No.: 15/017,949

(22) Filed: Feb. 8, 2016

(65) Prior Publication Data
US 2016/0241306 A1   Aug. 18, 2016

Related U.S. Application Data

(60) Provisional application No. 62/117,024, filed on Feb. 17, 2015.

(30) Foreign Application Priority Data

Apr. 21, 2015   (KR) .......................... 10-2015-0055642

(51) Int. Cl.
*H01Q 7/00*   (2006.01)
*H01Q 1/27*   (2006.01)
*H01Q 1/22*   (2006.01)
*H04B 5/00*   (2006.01)

(52) U.S. Cl.
CPC ........... *H01Q 1/273* (2013.01); *H01Q 1/2208* (2013.01); *H01Q 7/00* (2013.01); *H04B 5/0075* (2013.01)

(58) Field of Classification Search
CPC ............................... H01Q 1/2208; H01Q 7/00
See application file for complete search history.

(56) References Cited

U.S. PATENT DOCUMENTS

| | | | | |
|---|---|---|---|---|
| 5,508,710 A | * | 4/1996 | Wang | H01Q 7/00 343/726 |
| 5,589,840 A | * | 12/1996 | Fujisawa | H01Q 1/273 343/718 |
| 6,163,305 A | * | 12/2000 | Murakami | H01Q 7/08 343/788 |
| 6,335,622 B1 | * | 1/2002 | James | G01R 33/34023 324/318 |
| 6,664,936 B2 | * | 12/2003 | Ieda | H01Q 7/08 343/713 |

(Continued)

FOREIGN PATENT DOCUMENTS

| | | |
|---|---|---|
| JP | H0936630 A | 2/1997 |
| JP | H1070483 A | 3/1998 |
| KR | 101485569 B1 | 1/2015 |

*Primary Examiner* — Dameon E Levi
*Assistant Examiner* — Ab Salam Alkassim, Jr.
(74) *Attorney, Agent, or Firm* — Harness, Dickey & Pierce, P.L.C.

(57) ABSTRACT

In one embodiment, the antenna arrangement includes a primary antenna having a conductive sidewall; and a loop antenna disposed in and physically separated from the primary antenna. The loop antenna includes a first conductive loop and a capacitor electrically connected between ends of the first conductive loop.

16 Claims, 17 Drawing Sheets

(56) References Cited

U.S. PATENT DOCUMENTS

| | | | |
|---|---|---|---|
| 6,765,846 B2 | 7/2004 | Saitou et al. | |
| 6,798,385 B2 | 9/2004 | Kirino | |
| 7,170,462 B2* | 1/2007 | Ihara | G04G 21/04 343/718 |
| 7,522,117 B2* | 4/2009 | Takahashi | G04G 21/04 343/787 |
| 7,973,722 B1 | 7/2011 | Hill et al. | |
| 8,646,695 B2* | 2/2014 | Worrall | G06K 19/07762 235/488 |
| 8,750,949 B2 | 6/2014 | Merz et al. | |
| 9,112,271 B2* | 8/2015 | Mo | H01Q 1/243 |
| 9,196,964 B2* | 11/2015 | Baringer | A61B 5/0002 |
| 9,306,292 B2* | 4/2016 | Ryu | H01Q 5/35 |
| 9,413,191 B2* | 8/2016 | Kim | H02J 17/00 |
| 9,674,646 B2* | 6/2017 | Jang | H01Q 1/273 |
| 9,685,690 B2* | 6/2017 | Samardzija | G06F 1/163 |
| 9,912,058 B2* | 3/2018 | Palm | H01Q 7/08 |
| 10,020,565 B2* | 7/2018 | Lee | H01Q 1/273 |
| 10,027,023 B1* | 7/2018 | Kim | H01Q 1/273 |
| 10,116,044 B2* | 10/2018 | Zhu | H01Q 1/243 |
| 2006/0114162 A1* | 6/2006 | Minami | G04G 21/04 343/718 |
| 2007/0232371 A1* | 10/2007 | Soekawa | G06K 19/07749 455/575.5 |
| 2008/0293373 A1* | 11/2008 | Yasuoka | G04G 21/04 455/347 |
| 2009/0072628 A1* | 3/2009 | Cook | H01Q 7/005 307/104 |
| 2009/0096705 A1* | 4/2009 | Sato | H01Q 7/00 343/866 |
| 2009/0305657 A1* | 12/2009 | Someya | H01Q 1/273 455/269 |
| 2011/0266883 A1* | 11/2011 | Eray | H01Q 1/2225 307/104 |
| 2012/0098349 A1* | 4/2012 | Kim | H04B 5/0037 307/104 |
| 2012/0133597 A1* | 5/2012 | Chen | G06F 3/044 345/173 |
| 2012/0206239 A1* | 8/2012 | Ikemoto | G06K 7/10346 340/10.1 |
| 2012/0268328 A1* | 10/2012 | Kim | H01Q 1/243 343/702 |
| 2013/0038278 A1* | 2/2013 | Park | H02J 7/00 320/108 |
| 2013/0075477 A1* | 3/2013 | Finn | G06K 19/07794 235/492 |
| 2013/0176179 A1* | 7/2013 | Park | H01Q 1/243 343/702 |
| 2013/0194155 A1* | 8/2013 | Kuroda | H01Q 7/00 343/867 |
| 2013/0234910 A1 | 9/2013 | Oh et al. | |
| 2013/0308256 A1* | 11/2013 | Lehr | G06F 1/266 361/679.01 |
| 2014/0139380 A1* | 5/2014 | Ouyang | H01Q 7/00 343/702 |
| 2014/0154980 A1* | 6/2014 | Jang | H04B 5/0025 455/41.1 |
| 2014/0158775 A1* | 6/2014 | Hofer | G06K 19/07794 235/492 |
| 2014/0168019 A1* | 6/2014 | Hirobe | H01Q 5/40 343/720 |
| 2014/0179224 A1* | 6/2014 | Liao | H01Q 1/273 455/41.1 |
| 2014/0225786 A1* | 8/2014 | Lyons | H01Q 1/273 343/702 |
| 2014/0253393 A1* | 9/2014 | Nissinen | H01Q 1/36 343/702 |
| 2014/0253394 A1* | 9/2014 | Nissinen | H01Q 7/00 343/702 |
| 2015/0145635 A1* | 5/2015 | Kurz | H01F 38/14 336/232 |
| 2015/0214620 A1* | 7/2015 | Yosui | H01Q 7/00 343/702 |
| 2015/0249292 A1* | 9/2015 | Ouyang | H01Q 21/30 343/702 |
| 2015/0340754 A1* | 11/2015 | Asou | H01Q 7/04 343/788 |
| 2016/0006109 A1* | 1/2016 | Apaydin | H01Q 5/328 343/702 |
| 2016/0049721 A1* | 2/2016 | Aizawa | H01Q 1/273 343/718 |
| 2016/0063232 A1* | 3/2016 | Seol | G06F 3/03547 726/19 |
| 2016/0064804 A1* | 3/2016 | Kim | H01Q 1/243 343/702 |
| 2016/0124396 A1* | 5/2016 | Choi | G04R 60/10 368/281 |
| 2016/0126639 A1* | 5/2016 | Kim | H02J 50/10 307/104 |
| 2016/0142866 A1* | 5/2016 | Jang | H01Q 1/273 455/41.1 |
| 2016/0181696 A1* | 6/2016 | Rizzo | H01Q 1/243 343/702 |
| 2016/0187857 A1* | 6/2016 | Cho | G04R 20/00 368/47 |
| 2016/0205229 A1* | 7/2016 | Vincent | H01Q 1/273 455/575.7 |
| 2016/0254587 A1* | 9/2016 | Jung | H01Q 1/273 343/702 |
| 2016/0255733 A1* | 9/2016 | Jung | G06F 1/1633 361/759 |
| 2016/0261032 A1* | 9/2016 | Chang | H01Q 1/273 |
| 2016/0344096 A1* | 11/2016 | Erentok | H01Q 1/273 |
| 2016/0380337 A1* | 12/2016 | Lee | H01Q 1/243 343/702 |
| 2017/0005399 A1* | 1/2017 | Ito | H01Q 7/06 |
| 2017/0045916 A1* | 2/2017 | Kim | G06F 3/041 |
| 2017/0093021 A1* | 3/2017 | Kim | G06F 1/163 |
| 2017/0117093 A1* | 4/2017 | Kim | G06F 1/163 |
| 2017/0133752 A1* | 5/2017 | Choi | H01Q 5/50 |
| 2017/0179581 A1* | 6/2017 | Puuri | H01Q 1/273 |
| 2017/0272127 A1* | 9/2017 | Jang | H04B 5/0081 |
| 2017/0277990 A1* | 9/2017 | Tokunaga | G06K 19/077 |
| 2017/0365916 A1* | 12/2017 | Wu | H01Q 5/30 |
| 2018/0048056 A1* | 2/2018 | Jow | H01Q 1/2208 |
| 2018/0062245 A1* | 3/2018 | Wu | H01Q 9/28 |

\* cited by examiner

PORTABLE DEVICE AND NEAR FIELD COMMUNICATION CHIP

CROSS-REFERENCE TO RELATED APPLICATIONS

This U.S. non-provisional application claims the benefit of priority under 35 U.S.C. § 119 to U.S. Provisional Application No. 62/117,024 filed on Feb. 17, 2015 in the USPTO, and Korean Patent Application No. 10-2015-0055642 filed on Apr. 21, 2015 in the Korean Intellectual Property Office (KIPO), the entire contents of each of which are incorporated by reference herein in their entireties.

BACKGROUND

1. Technical Field

Example embodiments relate generally to electronic devices and, more particularly, to portable devices, and near field communication chips embedded in the portable devices.

2. Description of the Related Art

A portable device, such as a smart phone, has been widely used because of its high portability. Further, as one type of the portable device, there is a wearable electronic device that is used while being worn on a body, such as a wrist, a neck, a head, etc. of a human (or an animal), and the use of the wearable electronic device has been gradually increased. However, a conventional wearable electronic device cannot provide a near field communication (NFC). Thus, a wearable electronic device having an NFC function has been developed. However, the wearable electronic device can perform the near field communication at a back surface of the wearable electronic device opposite to a front surface where a display panel is located, and thus the wearable electronic device should be taken off to perform the near field communication.

SUMMARY

At least one embodiment relates to an antenna arrangement.

In one embodiment, the antenna arrangement includes a primary antenna having a conductive sidewall; and a loop antenna disposed in and physically separated from the primary antenna. The loop antenna includes a first conductive loop and a capacitor electrically connected between ends of the first conductive loop.

At least one embodiment relates to a portable device.

In one embodiment, the portable device includes an NFC chip; a case configured to generate a first magnetic field based on an electrical signal from the NFC chip; and a loop antenna physically separated from the NFC chip and the case. The loop antenna is configured to magnetically couple to the case such that the loop antenna forms a second magnetic field in response to the first magnetic field.

In another embodiment, the portable device includes a case, a near field communication (NFC) device and a loop antenna. The case includes a conductive material, and has at least a first terminal. The NFC device is electrically connected to the first terminal of the case, and is configured to provide an electrical signal to the case such that the case radiates a first magnetic field based on the electrical signal. The loop antenna is disposed inside the case, and is configured to magnetically couple to the case such that the loop antenna forms a second magnetic field in response to the first magnetic field.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
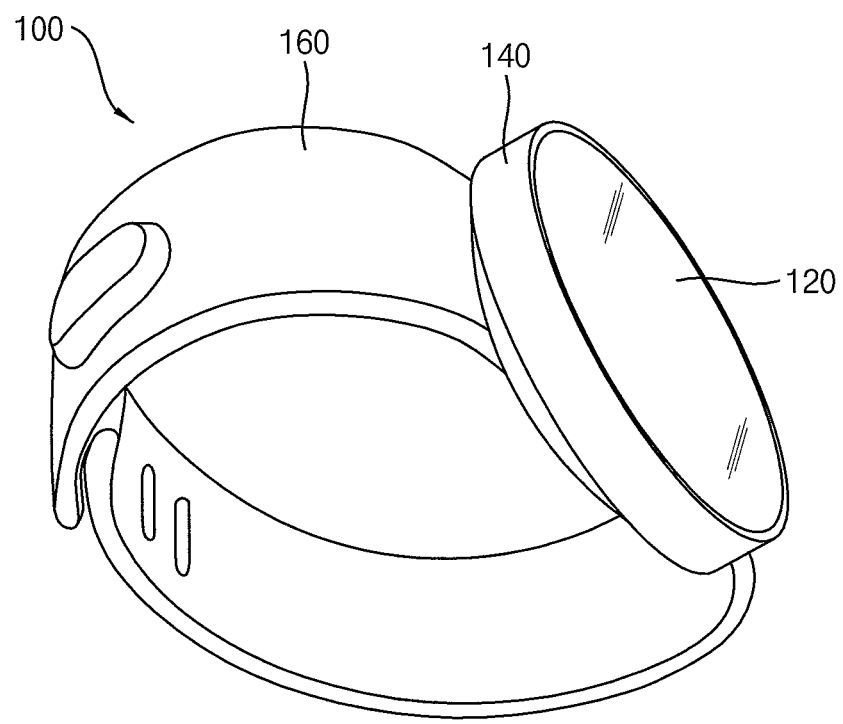
FIG. 1 is a diagram illustrating an example of a portable device according to some example embodiments.

Various example embodiments will be described more fully hereinafter with reference to the accompanying drawings, in which some example embodiments are shown. The present inventive concepts may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concepts.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
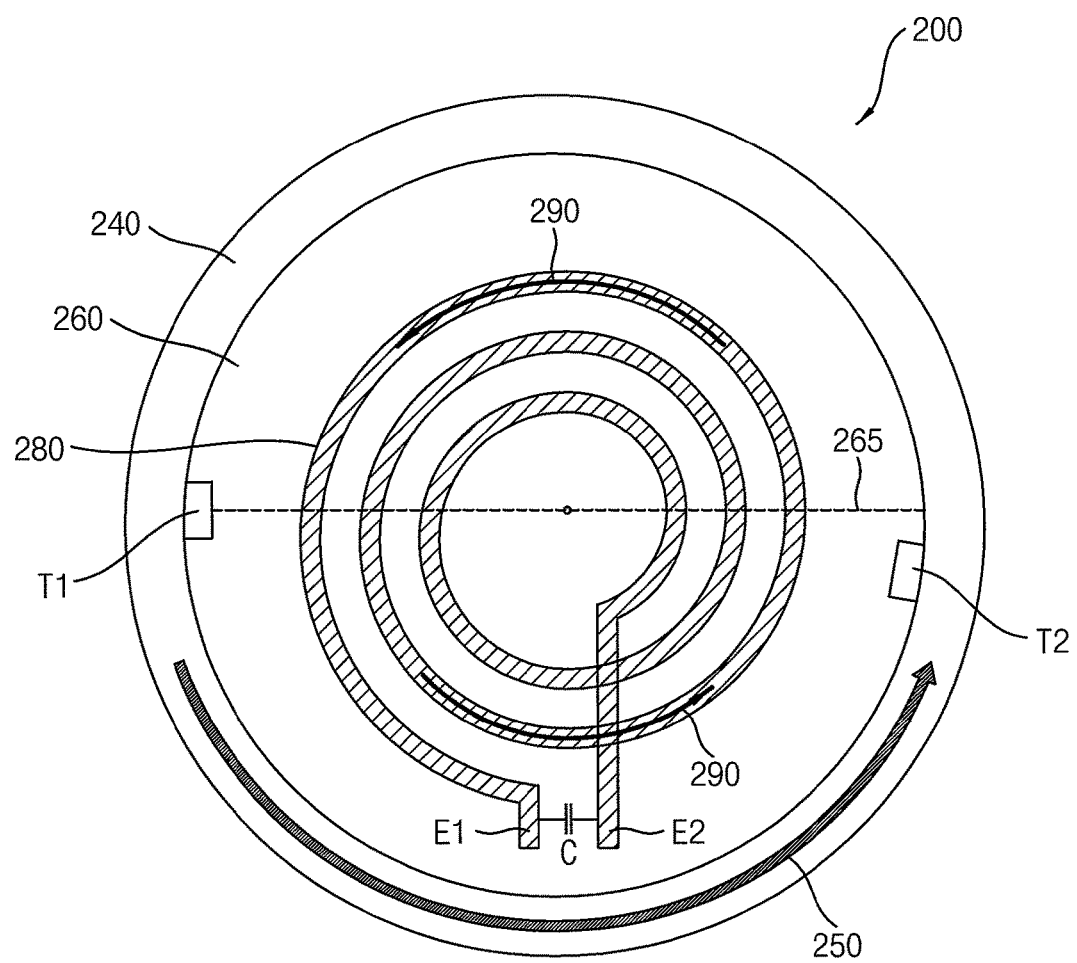
FIG. 2 is a diagram for describing a configuration of a portable device according to some example embodiments.
Figure 3:
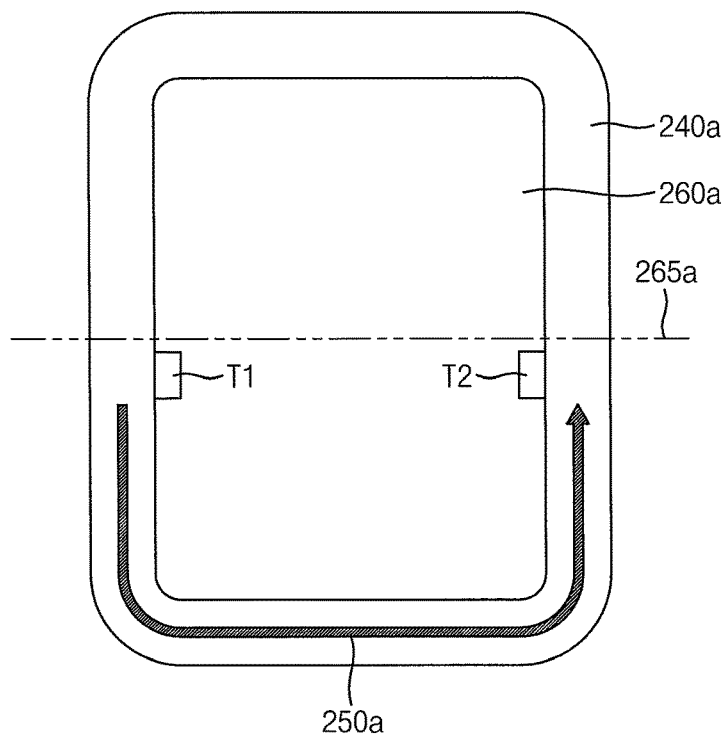
FIG. 3 is a diagram illustrating an example of a case employed in a portable device according to some example embodiments.
Figure 4:
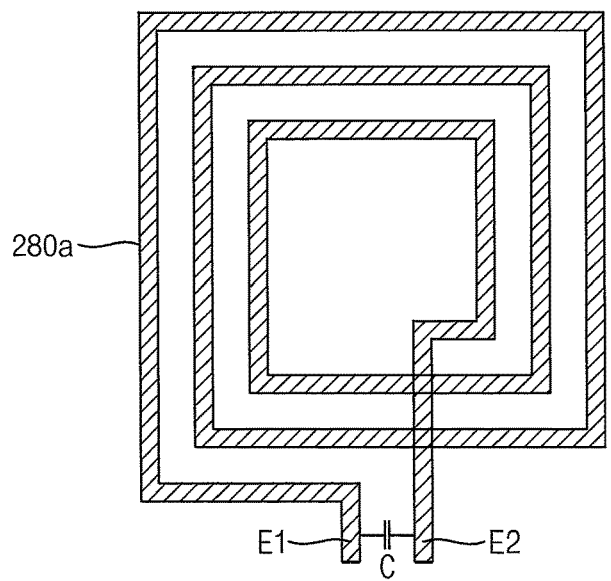
FIG. 4 is a diagram illustrating an example of a loop antenna employed in a portable device according to some example embodiments.
Figure 5:
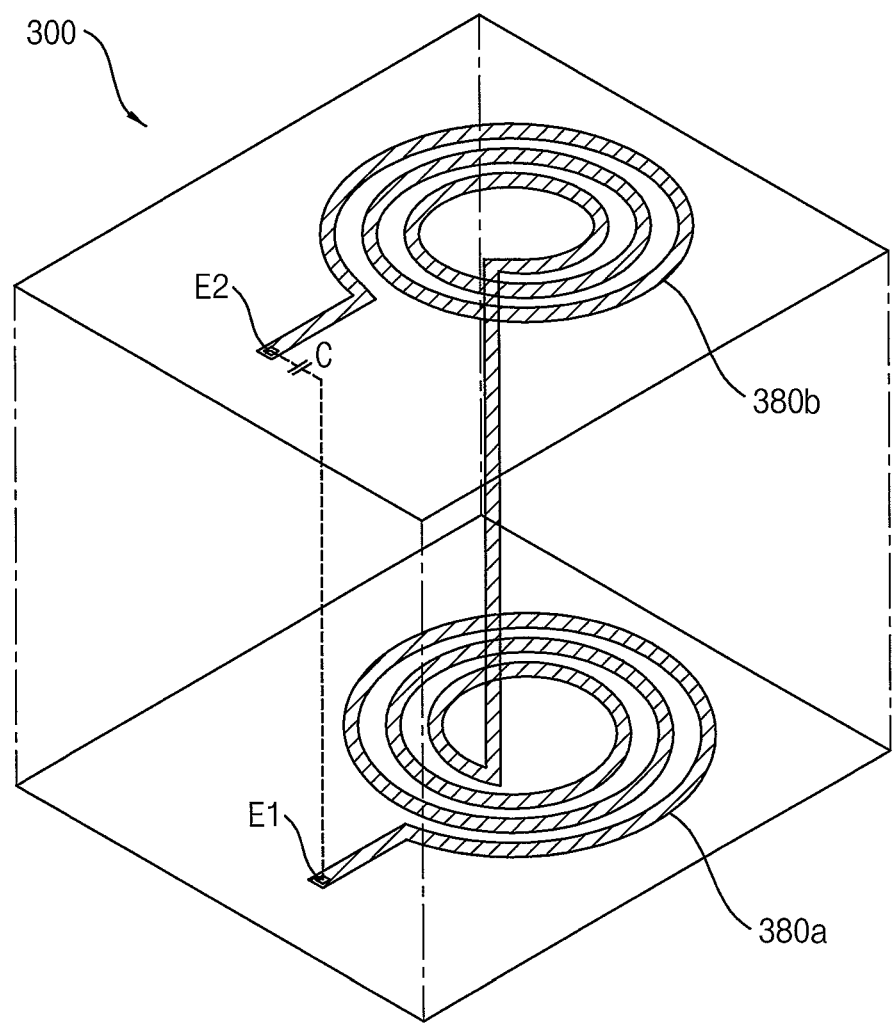
FIG. 5 is a diagram illustrating another example of a loop antenna employed in a portable device according to some example embodiments.

FIG. 1 is a diagram illustrating an example of a portable device according to some example embodiments, FIG. 2 is a diagram for describing a configuration of a portable device according to some example embodiments, FIG. 3 is a diagram illustrating an example of a case employed in a portable device according to some example embodiments, FIG. 4 is a diagram illustrating an example of a loop antenna employed in a portable device according to some example embodiments, FIG. 5 is a diagram illustrating another example of a loop antenna employed in a portable device according to some example embodiments, and FIGS. 6A through 6D are diagrams for describing examples of a capacitor included in a loop antenna of a portable device according to some example embodiments.

Referring to FIG. 1, a portable device 100 according to some example embodiments may be any electronic device that can be carried by a user. For example, the portable device 100 may be any electronic device, such as a cellular phone, a smart phone, a tablet computer, a laptop computer, a personal digital assistant (PDA), a portable multimedia player (PMP), a digital camera, a music player, a portable game console, a navigation system, etc.

Further, in some example embodiments, the portable device 100 may be a wearable electronic device that is used while being worn on a body of the user, such as a wrist, a neck, a head, etc. For example, as illustrated in FIG. 1, the portable device 100 may be a wrist-worn electronic device 100, such as a smart watch, a wrist band electronic device, etc. In other examples, the portable device may be any wearable electronic device, such as a necklace type electronic device, a glasses type electronic device, etc.

In some example embodiments, an appearance of the portable device 100 may be provided by a display panel 120, a case (or a housing) 140 and a band portion 160. The display panel 120 may display an image. In some example embodiments, the display panel 120 may be an organic light emitting diode (OLED) display panel or a liquid crystal display (LCD) panel, but not limited thereto. In some example embodiments, the display panel 120 may be a curved display panel having a curved surface or a flat display panel having a flat surface, but not limited thereto. Further, in some example embodiments, the display panel 120 may have any shape, such as a circular shape, a rectangular shape, a polygonal shape having five or more sides, an elliptical shape, or the like. In some example embodiments, the display panel 120 may include any type of touch sensor, such as an add-on type touch sensor, an on-cell type touch sensor, an in-cell type touch sensor, etc.

The band portion 160 may be formed to be readily worn by the user. In some example embodiments, the band portion 160 may include one or more materials, such as rubber, silicone, plastic, Mylar, vinyl, metal, etc.

The case (or housing) 140 may support the display panel 120, and may define an internal space along with the display panel 120. In some example embodiments, the case 140 may expose a button, a camera lens, an infrared module, etc. The case 140 may include a conductive material. In some example embodiments, the case 140 may be a metal case including a metal material. In this example, at least a portion of the case 140 may be formed of any metal material having a desired strength and a desired electrical conductivity. In some example embodiments, the case 140 may have a side wall portion and a back cover portion. The side wall portion of the case 140 may be formed of the conductive material or the metal material, and the back cover portion of the case 140 may be formed of a nonconductive material. In other example embodiments, both of the side wall portion and the back cover portion of the case 140 may be formed of the conductive material or the metal material. For example, the side wall portion and/or the back cover portion of the case 140 may include at least one of copper (Cu), aluminum (Al), iron (Fe), titanium (Ti), silver (Ag), palladium (Pd), platinum (Pt), aurum (Au), nickel (Ni) and the like. In some example embodiments, the case 140 may have a unitary structure where the side wall portion and the back cover portion are integrally formed. In other example embodiments, the side wall portion and the back cover portion may be attached to each other to form the case 140. Since at least the portion of the case 140 is formed of the metal material, the portable device 100 may have an improved strength and a good appearance.

A main board may be located in the internal space defined by the case 140. Various electrical components may be disposed on the main board. For example, a processor controlling an operation of the portable device 100 may be disposed on the main board. In some example embodiments, the processor may be any processor, such as an application processor (AP), a central processing unit (CPU), a microcontroller (MCU), etc.

A memory may be further disposed on the main board. The memory may store a boot image for booting the portable device 100, or may store data transmitted/received to/from an external device. For example, the memory may include a volatile memory, such as a dynamic random access memory (DRAM), a static random access memory (SRAM), a mobile DRAM, DDR SDRAM, LPDDR SDRAM, GDDR SDRAM, RDRAM, etc., and/or a nonvolatile memory, such as an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

In some example embodiments, the processor and the memory may be packaged as a package on package (PoP). In other example embodiments, the processor and the memory may be packaged in various forms, such as ball grid arrays (BGAs), chip scale packages (CSPs), plastic leaded chip carrier (PLCC), plastic dual in-line package (PDIP), die in waffle pack (DIWP), die in wafer form (DIWF), chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP).

In some example embodiments, various components, such as a power management integrated circuit (PMIC), a sensor, an audio codec, a Bluetooth controller, etc., may be further disposed on the main board. For example, the sensor may include an accelerometer, a gyroscope, a heart rate sensor, etc. In some example embodiments, the processor, the memory, the PMIC, the sensor, and the like may be disposed on one surface of the main board. In other example embodiments, the processor, the memory, the PMIC, the sensor, and the like may be disposed on both surfaces of the main board.

The portable device 100 according to some example embodiments may include a near field communication (NFC) chip connected to the case 140. In some example embodiments, the NFC chip may be located in the internal space defined by the case 140. The NFC chip may be located on the main board. In some example embodiments, the NFC chip may be located in any position, such as inside the band portion 160. The NFC chip may include an NFC controller connected to the case 140. The NFC controller may perform a near field communication by providing an electrical signal to the case 140.

In some example embodiments, the NFC chip may further include a secure storage device connected to the NFC controller. The secure storage device may store information to be transferred to an external device through the near field communication. For example, the secure storage device may store payment information (e.g., credit card information), an encryption key, etc. For example, the secure storage device may be an embedded secure element (eSE). In some example embodiments, the NFC controller and the secure storage device may be packaged as one chip (or one package) using a system in package (SIP) technique.

The case 140 may have first and second terminals spaced apart from each other, and at least one of the first and second terminals of the case 140 may be connected to the NFC chip. In some example embodiments, the NFC chip may output a differential electrical signal, and the first and second terminals of the case 140 may be connected to the NFC chip to receive the differential electrical signal. In other example embodiments, the NFC chip may output a single-ended electrical signal, one of the first and second terminals of the case 140 may be connected to the NFC chip to receive the singled-ended electrical signal, and the other of the first and second terminals of the case 140 may be grounded. In still other example embodiments, the NFC chip may output a differential electrical signal, the differential electrical signal may be converted into a single-ended electrical signal by a transformer (e.g., a balun (balanced-to-unbalanced) transformer), one of the first and second terminals of the case 140 may be connected to the NFC chip to receive the singled-ended electrical signal, and the other of the first and second terminals of the case 140 may be grounded.

The NFC chip may provide the electrical signal to the case 140, and the case 140 may radiate a first magnetic field based on the electrical signal. For example, as illustrated in FIG. 2, the case 140 and 240 of the portable device 100 and 200 may have a first terminal T1 and a second terminal T2, and the NFC chip may provide the electrical signal to the first terminal T1 and/or the second terminal T2 of the case 140 and 240. According to some example embodiments, a current path 250 may be formed in a direction from the first terminal T1 to the second terminal T2, or in a direction from the second terminal T2 to the first terminal T1, or the direction of the current path 250 may be dynamically changed. To achieve a sufficient length of the current path 250, the first terminal T1 and the second terminal T2 may be spaced apart from each other. In some example embodiments, as illustrated in FIG. 2, the first and second terminals T1 and T2 of the case 140 and 240 may be spaced apart from each other such that a loop antenna 280 and a capacitor C are located between the first and second terminals T1 and T2 of the case 140 and 240. For example, the second terminal T2 may be located near (or substantially on) a straight line 265 connecting the first terminal T1 and a center point of the internal space 260 defined by the case 140 and 240. In this case, the current path 250 may be formed at a shorter one (e.g., a lower region of the case 140 and 240 in an example of FIG. 2) of two regions between the first terminal T1 and the second terminal T2. In another example, the second terminal T2 may be 120 degrees from the first terminal T1 on the case. When the NFC chip provides the electrical signal to the first terminal T1 and/or the second terminal T2, the electrical signal (e.g., a current) may flow through the current path 250 of the case 140 and 240, and thus the case 140 and 240 may radiate a first magnetic field. The case 140 and 240 may radiate the first magnetic field not only toward the outside of the portable device 100 and 200, but also toward the internal space 260.

Although FIG. 2 illustrates an example where the side wall portion of the case 140 and 240 has a circular shape, according to some example embodiments, the side wall portion of the case 140 and 240 may have any shape, such as an elliptical shape, a rectangular shape, a polygonal shape, etc. For example, as illustrated in FIG. 3, a side wall portion of a case 240a defining an internal space 260a may have a rectangular shape. In this case, to achieve a sufficient length of a current path 250a, the case 240a may have first and second terminals T1 and T2 that are spaced apart from each other and are located near a straight line 265a that bisects the internal space 260a.

In a conventional portable device using a case or a side wall portion of the case as an antenna, a slit is formed at the side wall portion of the case, and terminals to which an electrical signal is applied are located adjacent to each other such that the slit (or an insulator filled in the slit) is located between the terminals. However, in the portable device 100 and 200 according to some example embodiments, the case 140 and 240 or the side wall portion of the case 140 and 240 may have a unitary structure with no slit. Accordingly, compared with the conventional portable device where the slit (or the insulator filled in the slit) is formed at the side wall portion of the case, the case 140 and 240 of the portable device 100 and 200 according to some example embodiments may have an improved waterproof function and an improved aesthetic impression.

As illustrated in FIG. 2, a loop antenna 280 and capacitor C may be further located in the internal space 260 defined by the case 140 and 240 of the portable device 100 and 200. The loop antenna 280 and capacitor C may be spaced apart from the case 140 and 240 such that the loop antenna 280 and capacitor C are not physically connected to the case 140 and 240. Further, the loop antenna 280 and capacitor C may not be physically connected to the NFC antenna, and may not receive the electrical signal from the NFC chip. However, the loop antenna 280 and capacitor C may be magnetically (or mutual-inductively) coupled to the case 140 and 240. Thus, based on the first magnetic field radiated by the case 140 and 240, a current may flow through a current path 290 of the loop antenna 280 and capacitor C in a direction (e.g., a counter-clockwise direction in an example of FIG. 2) the same as a direction of the current path 250 of the case 140 and 240, and, by this current flow, a second magnetic field may be radiated at the loop antenna 280 and C.

Thus, the case 140 and 240 of the portable device 100 and 200 according to some example embodiments may have the relatively short current path 250. And, magnetic field radiation efficiency of the case 140 and 240 may be reduced due to the relatively short current path 250. However, since the second magnetic field is additionally radiated by the loop antenna 280 and capacitor C that are magnetically coupled to the case 140 and 240, total magnetic field radiation efficiency of the portable device 100 and 200 may be improved. Accordingly, the portable device 100 and 200 according to some example embodiments may efficiently perform the near field communication using the case 140 and 240 and the loop antenna 280 and C. In some example embodiments, to efficiently receive power based on the first magnetic field radiated by the case 140 and 240, the loop antenna 280 and capacitor C may have a resonance frequency substantially the same as a resonance frequency of the case 140 and 240. For example, the case 140 and 240 and the loop antenna 280 and capacitor C may have substantially the same resonance frequency of about 13.56 MHz.

In some example embodiments, the loop antenna 280 and capacitor C may include a loop coil 280 located inside the case 140 and 240 and a capacitor C connected between a first end E1 and a second end E2 of the loop coil 280. The loop coil 280 may be located in the internal space 260 defined by the case 140 and 240, and may be spaced apart from the case 140 and 240. The loop coil 280 may be formed of any metal material having a high conductivity, such as copper, silver, aluminum, etc. Although FIG. 2 illustrates an example where the loop coil 280 has three turns, the loop coil 280 may have an appropriate number of turns for a desired inductance according to example embodiments. For example, the loop coil 280 may have one or more turns. Further, although FIG. 2 illustrates an example where the loop coil 280 has a circular shape, according to some example embodiments, the loop coil 280 may have any shape, such as an elliptical shape, a rectangular shape, a polygonal shape, etc. For example, as illustrated in FIG. 4, the loop coil 280a may have the rectangular shape. In some example embodiments, the loop coil 280 may be formed as a single layer. In other example embodiments, the loop coil 280 may have a multi-layer structure. That is, the loop coil 280 may be formed at two or more layers. For example, as illustrated in FIG. 5, a loop antenna 300 may include a loop coil 380a and 380b having the multi-layer structure. The loop coil 380a and 380b may include a first loop coil 380a formed at a first layer L1 and a second loop coil 380b formed at a second layer L2. The loop antenna 300 may further include a capacitor C connected between a first end E1 and a second end E2 of the loop coil 380a and 380b having the multi-layer structure. According to some example embodiments, to form the loop coil 380a and 380b having the multi-layer structure, the first and second loop coils 380a and 380b may be disposed on opposite surfaces of the same substrate (or film), or may be disposed on different substrates (or films).

Figure 6A:
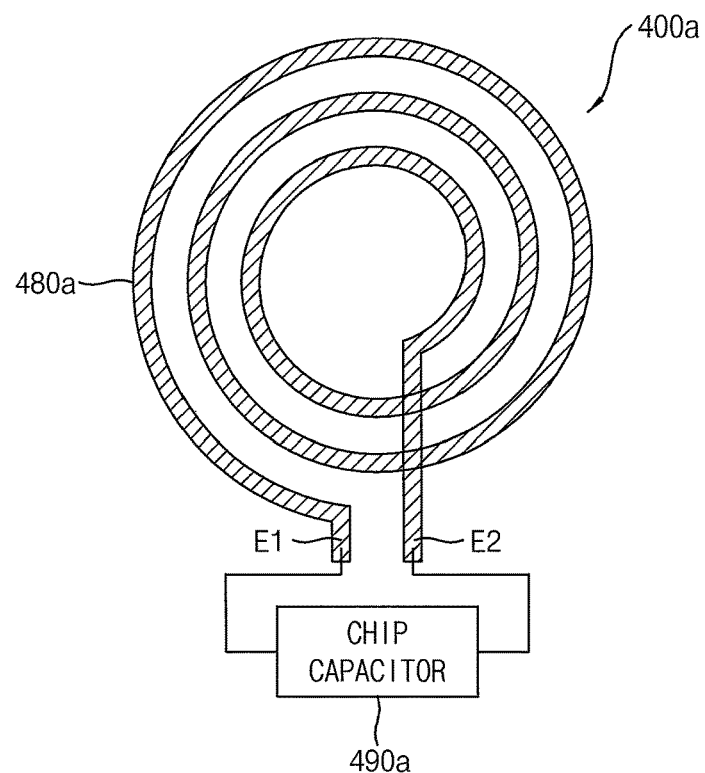
FIGS. 6A through 6D are diagrams for describing examples of a capacitor included in a loop antenna of a portable device according to some example embodiments.
Figure 6B:
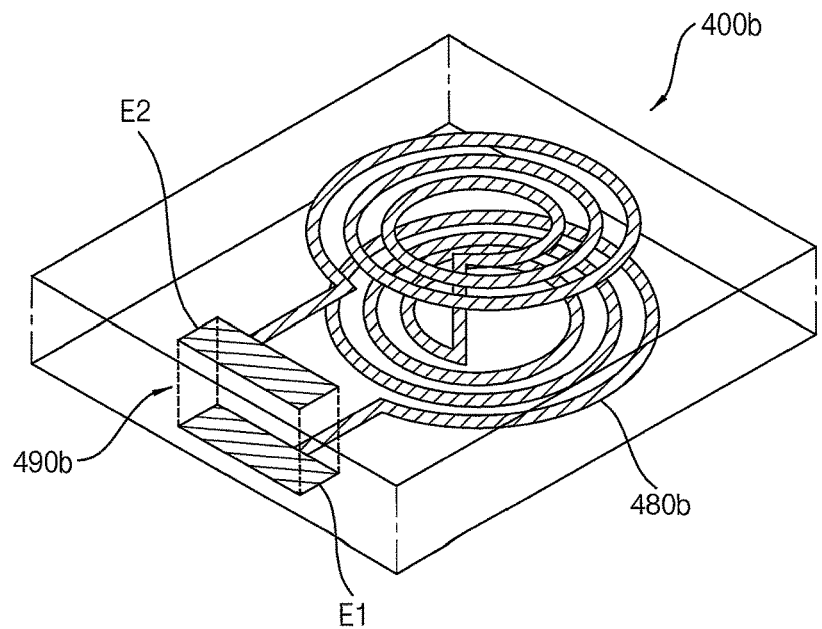
Figure 6C:
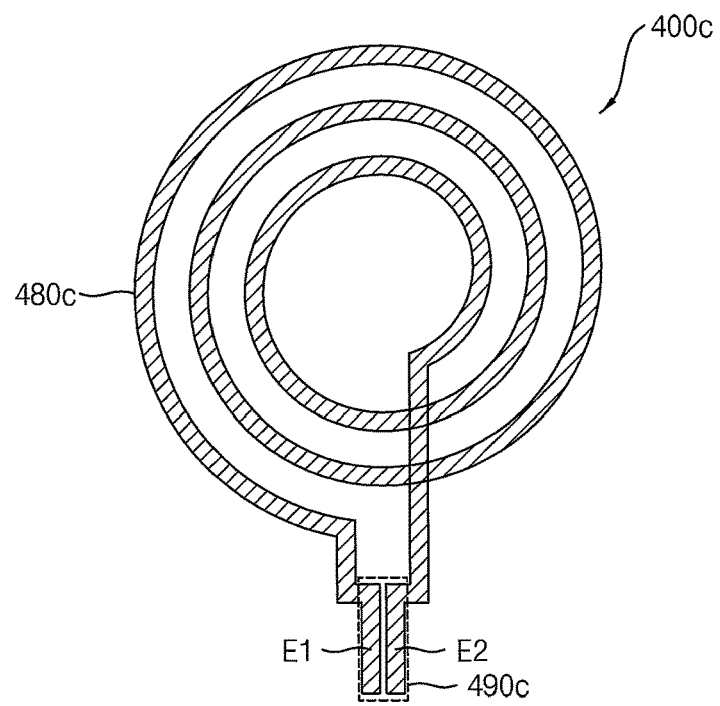
Figure 6D:
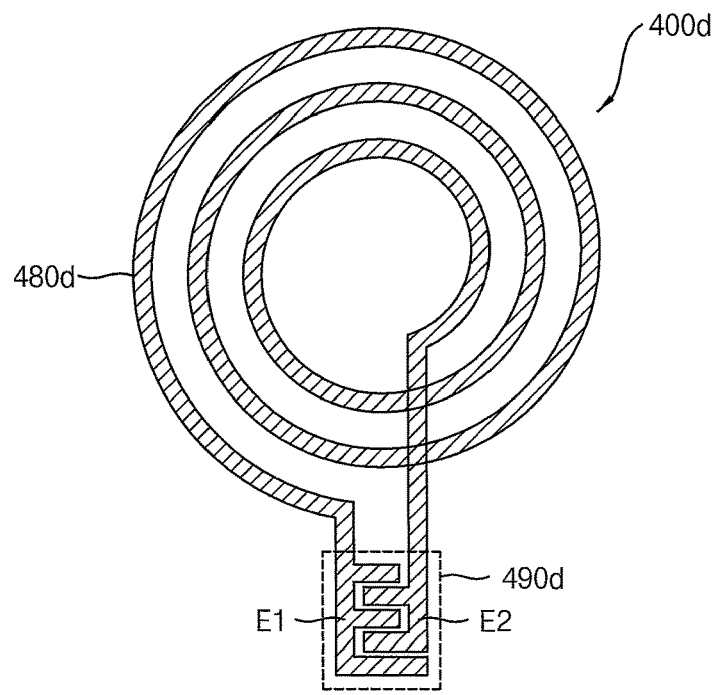

The capacitor C connected between the first and second ends E1 and E2 of the loop coil 280 may have an appropriate capacitance such that the loop antenna 280 and capacitor C has desired resonance frequency (e.g., about 13.56 MHz). According to some example embodiments, the capacitor C may be implemented in various forms. In some example embodiments, as illustrated in FIG. 6A, the loop antenna 400a may include, as the capacitor C, a chip capacitor 490a that is implemented as a chip. The chip capacitor 490a may be connected between the first and second ends E1 and E2 of the loop coil 480a. In other example embodiments, the capacitor C may be formed by metal patterns extending from the first and second ends E1 and E2 of the loop coil 280. For example, as illustrated in FIG. 6B, the loop antenna 400b may include a metal-insulator-metal (MIM) capacitor 490b. The MIM capacitor 490b may be formed by metal patterns that extend from the first and second ends E1 and E2 of the loop coil 480b and are formed at different layers. In another example, as illustrated in FIG. 6C, the loop antenna 400c may include an edge-coupled capacitor 490c. The edge-coupled capacitor 490c may be formed by metal patterns that extend from the first and second ends E1 and E2 of the loop coil 480c and are located adjacent to each other. In still another example, as illustrated in FIG. 6D, the loop antenna 400d may include an interdigital capacitor 490d. The interdigital capacitor 490d may be formed by metal patterns that extend from the first and second ends E1 and E2 of the loop coil 480c and have a comb shape.

The portable device 100 and 200 according to some example embodiments may perform the near field communication by radiating the first magnetic field using the case 140 and 240 connected to the NFC chip and by further radiating the second magnetic field using the loop antenna 280 and capacitor C magnetically coupled to the case 140 and 240. In the portable device 100 and 200 according to some example embodiments, the case 140 and 240 (or the side wall portion of the case 140 and 240) may have the unitary structure having no slit, and thus the waterproof function and the aesthetic impression of the case 140 and 240 and the portable device 100 and 200 may be improved. Further, since the loop antenna 280 and capacitor C magnetically coupled to the case 140 and 240 forms the second magnetic field in response to the first magnetic field formed at the case 140 and 240, the magnetic field radiation efficiency of the portable device according to some example embodiments may be improved.

Each of the following described embodiments may employ or incorporate any aspect of the foregoing embodiments except for the noted or implied differences.

Figure 7:
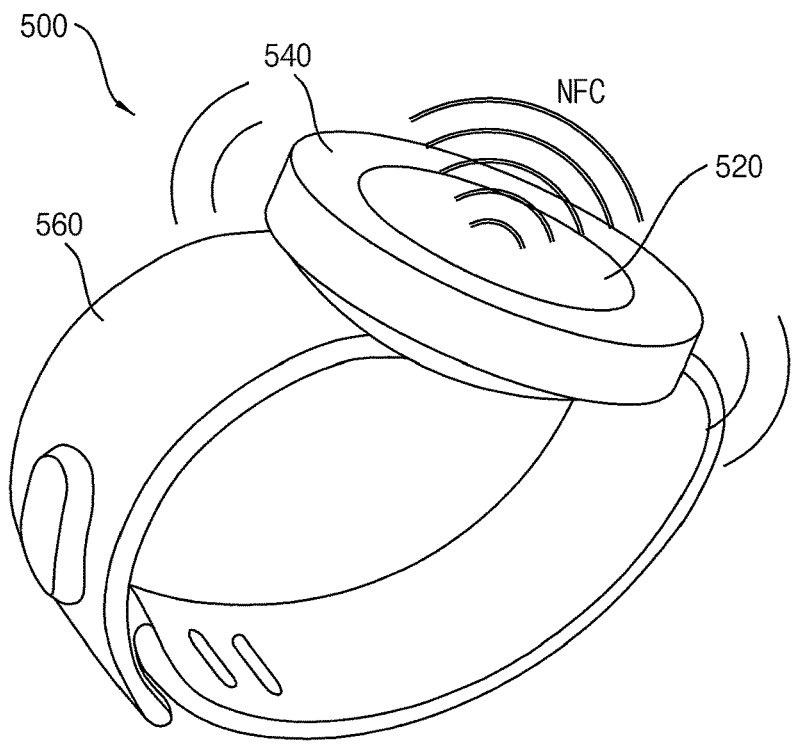
FIG. 7 is a diagram illustrating a portable device according to some example embodiments.
Figure 8:
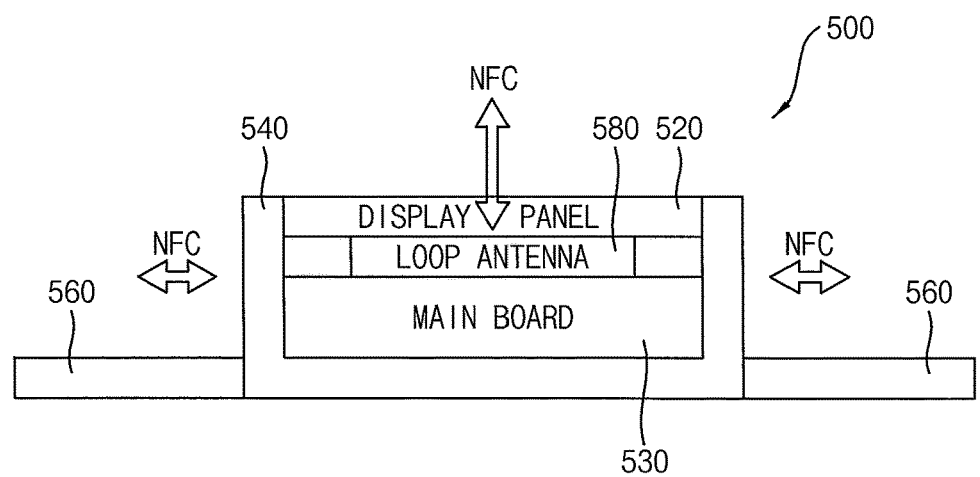
FIG. 8 is a diagram for describing a configuration of a portable device according to some example embodiments.

FIG. 7 is a diagram illustrating a portable device according to some example embodiments, and FIG. 8 is a diagram for describing a configuration of a portable device according to some example embodiments.

Referring to FIGS. 7 and 8, a portable device 500 includes a display panel 520, a case 540 that supports the display panel 520 and defines an internal space, a main board 530 located in the internal space defined by the case 540, a band portion 560 configured to be worn on a body of a user, and a loop antenna 580 located between the display panel 520 and the main board 530.

The main board 530 is located inside the case 540, and a processor may be disposed on the main board 530. The processor may control an operation of the portable device 500. In some example embodiments, a memory, a PMIC, a sensor, etc. may be further disposed on the main board 530. In some example embodiments, an NFC chip for performing a near field communication may be further disposed on the main board 530, and the NFC chip may be connected to the case 540.

The case 540 may have a side wall portion defining a side surface of the portable device 500 and a back cover portion defining a back surface of the portable device 500. In some example embodiments, the case 540 may have a unitary structure where the side wall portion and the back cover portion are integrally formed, for example, molded. In other example embodiments, the side wall portion and the back cover portion may be separately formed, and then attached to each other.

The case 540 may include a conductive material (e.g., a metal material), and may radiate a first magnetic field based on an electrical signal provided by the NFC chip. That is, the portable device 500 may perform the near field communication by radiating the first magnetic field in all directions using the case 540. The first magnetic field may be radiated not only to the outside, but also to the inside of the case 540. Accordingly, the first magnetic field radiated by the case 540 may be provided to the loop antenna 580 that is magnetically coupled to the case 540.

The loop antenna 580 may be located between the display panel 520 and the main board 530 inside the case 540. The loop antenna 580 magnetically coupled to the case 540 may form a second magnetic field in response to the first magnetic field formed at the case 540. For example, when an NFC chip applies the electrical signal to terminals of the case 540, a current may flow through a region of the case 540 between the terminals, and thus the first magnetic field may be radiated at the case 540. The first magnetic field radiated at the case 540 may be provided to the loop antenna 580, and thus, in the loop antenna 580, a current may be induced in the same direction as the current in the case 540, which results in the radiation of the second magnetic field. Although the second magnetic field radiated by the loop antenna 580 may be shielded by the main board 530, the second magnetic field may pass through the display panel 520 since the loop antenna 580 is located between the display panel 520 and the main board 530. That is, the loop antenna 580 may radiate the second magnetic field in a front direction of the portable device 500, and thus the portable device 500 may perform the near field communication with an external device located in front of the portable device 500.

Accordingly, in a case where the portable device 500 is a wearable electronic device (e.g., a smart watch), the wearable electronic device may perform the near field communication while being worn on a body of a user.

In some example embodiments, the portable device 500 may further include a magnetic sheet disposed under a back surface of the loop antenna 580. That is, the magnetic sheet may be located between the loop antenna 580 and the main board 530. The magnetic sheet may improve magnetic field radiation efficiency of the loop antenna 580 by preventing the magnetic field for the near field communication from being reduced by an eddy current caused by a change of the magnetic field at the main board 530. For example, the magnetic sheet may be a ferrite sheet or a magneto-dielectric material (MDM) sheet.

Figure 9:
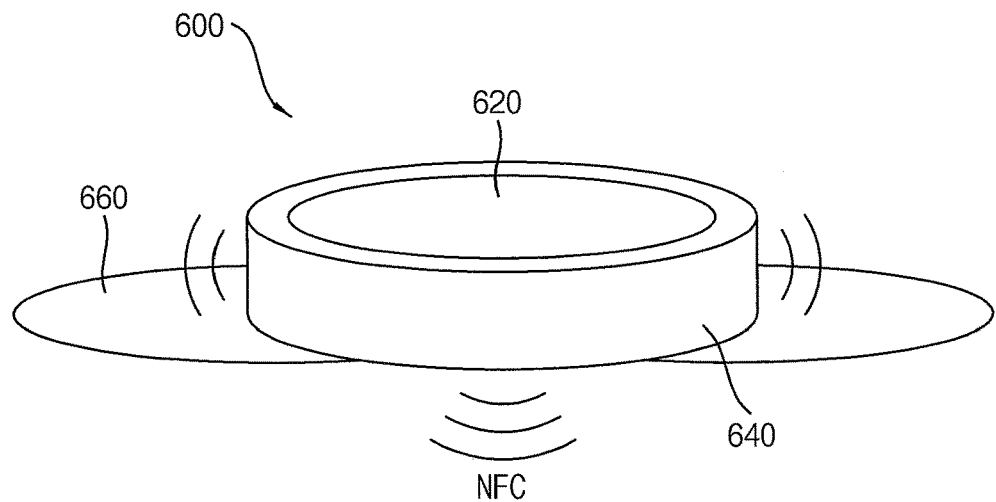
FIG. 9 is a diagram illustrating a portable device according to some example embodiments.
Figure 10:
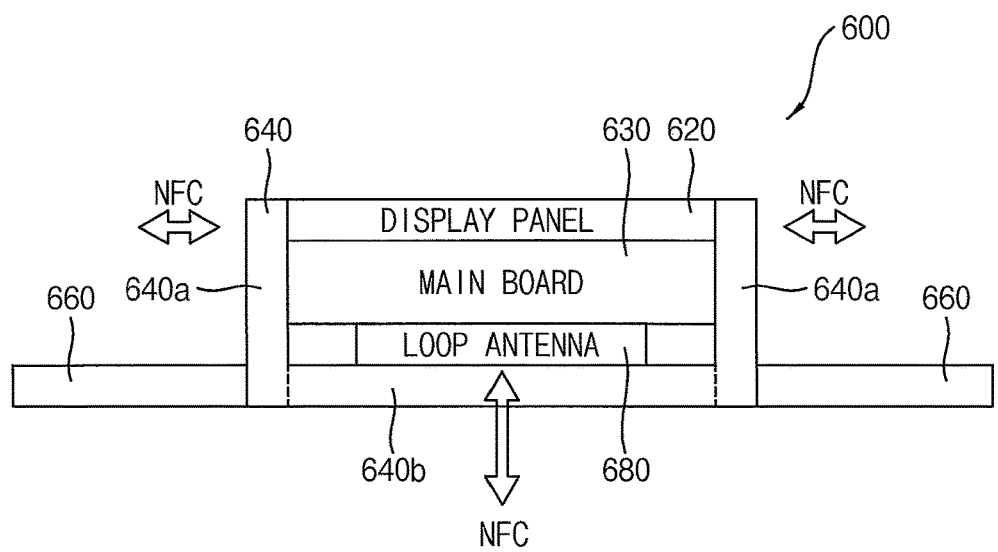
FIG. 10 is a diagram for describing a configuration of a portable device according to some example embodiments.

FIG. 9 is a diagram illustrating a portable device according to some example embodiments, and FIG. 10 is a diagram for describing a configuration of a portable device according to some example embodiments.

Referring to FIGS. 9 and 10, a portable device 600 includes a display panel 620, a case 640 that supports the display panel 620 and defines an internal space, a main board 630 located in the internal space defined by the case 640, a band portion 660 configured to be worn on a body of a user, and a loop antenna 680 located between the main board 630 and a back cover portion 640*b* of the case 640. The portable device 600 of FIGS. 9 and 10 may have a similar configuration to a portable device 500 of FIGS. 7 and 8, except for a location of the loop antenna 680.

The case 640 may have a side wall portion 640*a* defining a side surface of the portable device 600 and the back cover portion 640*b* defining a back surface of the portable device 600. In some example embodiments, the side wall portion 640*a* may be formed of a conductive material (e.g., a metal material), and the back cover portion 640*b* may be formed of a nonconductive material (e.g., a nonmetal material or an insulating material). The side wall portion 640*a* and the back cover portion 640*b* may be attached to each other.

The side wall portion 640*a* may have first and second terminals spaced apart from each other, and an NFC chip may be connected to at least one of the first and second terminals of the side wall portion 640*a*. The side wall portion 640*a* of the case 640 may have a unitary structure with no slit, and thus a waterproof function and an aesthetic impression of the side wall portion 640*a* of the case 640 may be improved. The NFC chip may provide an electrical signal to the case 640 (or the side wall portion 640*a*), and the case 640 (or the side wall portion 640*a*) may radiate a first magnetic field.

The loop antenna 680 may be located between the main board 630 and the back cover portion 640*b* inside the case 540. The loop antenna 680 magnetically coupled to the case 640 (or the side wall portion 640*a*) may form a second magnetic field in response to the first magnetic field formed at the case 640 (or the side wall portion 640*a*). Although the second magnetic field radiated by the loop antenna 680 may be shielded by the main board 630, the second magnetic field may pass through the back cover portion 640*b* formed of the nonconductive material. That is, since the loop antenna 680 is located between the main board 630 and the back cover portion 640*b*, the loop antenna 680 may radiate the second magnetic field in a direction passing through the back cover portion 640*b* of the cover 640. Accordingly, the portable device 600 may perform a near field communication with an external device located in the back of the portable device 600.

In some example embodiments, the portable device 600 may further include a magnetic sheet disposed on a surface of the loop antenna 680 opposite to the direction toward the back cover portion 640*b*. That is, the magnetic sheet may be located between the main board 630 and the loop antenna 680. The magnetic sheet may improve magnetic field radiation efficiency of the loop antenna 680.

Figure 11:
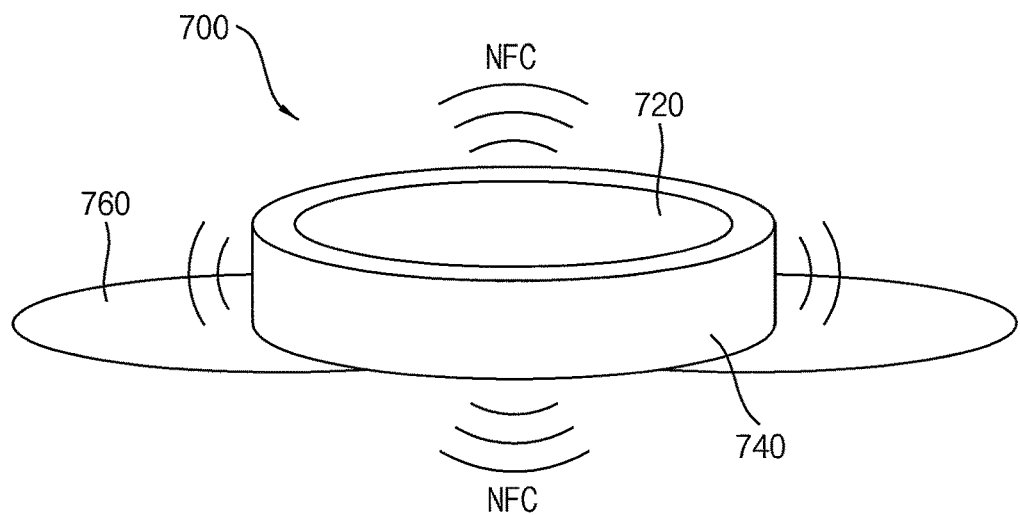
FIG. 11 is a diagram illustrating a portable device according to some example embodiments.
Figure 12:
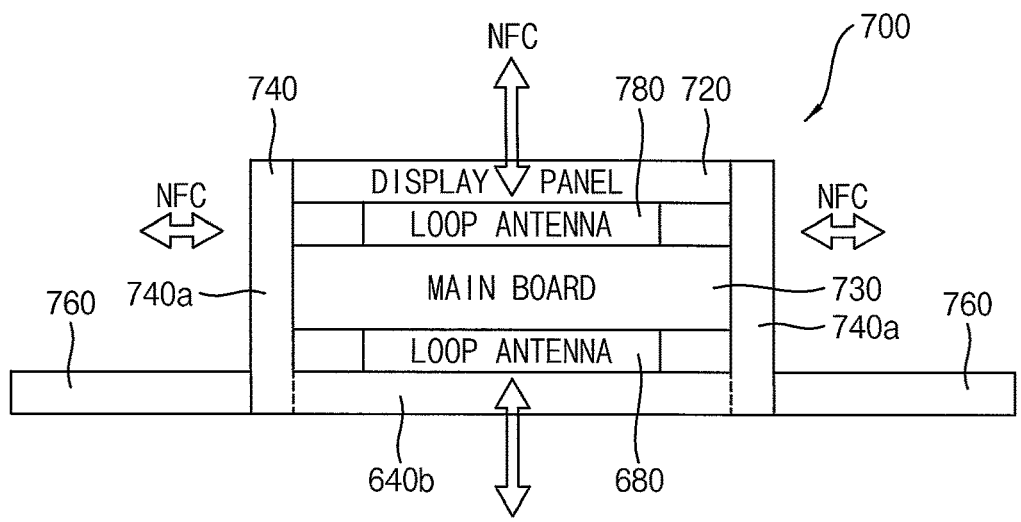
FIG. 12 is a diagram for describing a configuration of a portable device according to some example embodiments.

FIG. 11 is a diagram illustrating a portable device according to some example embodiments, and FIG. 12 is a diagram for describing a configuration of a portable device according to some example embodiments.

Referring to FIGS. 11 and 12, a portable device 700 includes a display panel 720, a case 740 that supports the display panel 720 and defines an internal space, a main board 730 located in the internal space defined by the case 740, a band portion 760 configured to be worn on a body of a user, a first loop antenna 780 located between the display panel 720 and the main board 730, and a second loop antenna 785 located between the main board 730 and a back cover portion 740*b* of the case 740. The portable device 700 of FIGS. 11 and 12 may have a similar configuration to a portable device 500 of FIGS. 7 and 8 or a portable device 600 of FIGS. 9 and 10, except the loop antenna 780 and 785.

The case 740 may have a side wall portion 740*a* defining a side surface of the portable device 700 and the back cover portion 740*b* defining a back surface of the portable device 700. In some example embodiments, the side wall portion 740*a* may be formed of a conductive material (e.g., a metal material), and the back cover portion 740*b* may be formed of a nonconductive material (e.g., a nonmetal material or an insulating material). The side wall portion 740*a* may have first and second terminals spaced apart from each other, and an NFC chip may be connected to at least one of the first and second terminals of the side wall portion 740*a*. The NFC chip may provide an electrical signal to the case 740 (or the side wall portion 740*a*), and the case 740 (or the side wall portion 740*a*) may radiate a first magnetic field.

The first loop antenna 780 may be located between the display panel 720 and the main board 730 inside the case 740, and the second loop antenna 785 may be located between the main board 730 and the back cover portion 740*b* inside the case 740. Each of the first and second loop antennas 780 and 785 may be magnetically coupled to the case 740 (or the side wall portion 740*a*), and may form a second magnetic field in response to the first magnetic field formed at the case 740 (or the side wall portion 740*a*). The second magnetic field radiated by the first loop antenna 780 may pass through the display panel 720, and the second magnetic field radiated by the second loop antenna 785 may pass through the back cover portion 740*b* of the case 740. Thus, the first loop antenna 780 may radiate the second magnetic field in a direction passing through the display panel 720, and the second loop antenna 785 may radiate the second magnetic field in a direction passing through the back cover portion 740*b* of the case 740. Accordingly, the portable device 700 according to some example embodiments may perform a near field communication with an external device located at any position. In some example embodiments, the portable device 700 may further include a magnetic sheet located the first loop antenna 780 and the main board 730, and/or a magnetic sheet located the main board 730 and the second loop antenna 785.

Figure 13A:
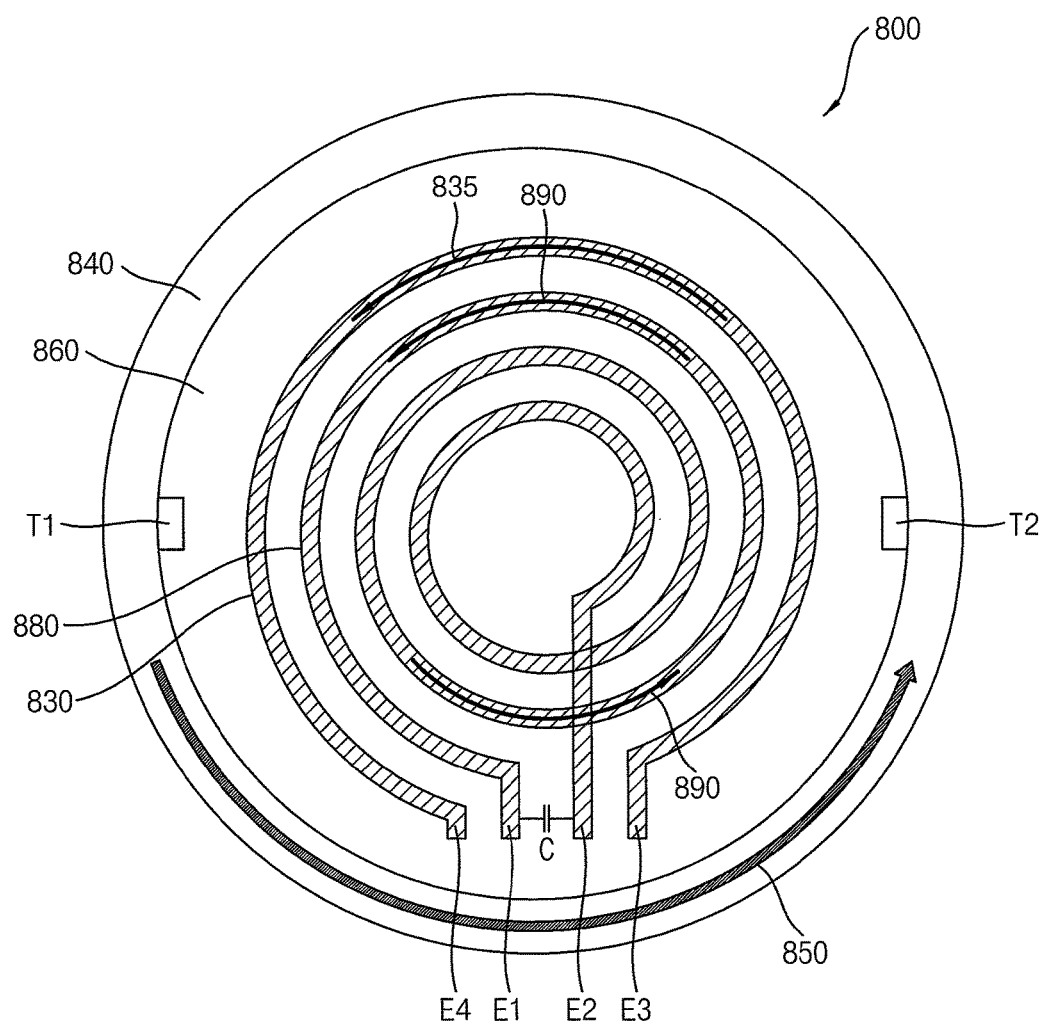
FIG. 13A is a diagram for describing a configuration of a portable device according to some example embodiments.
Figure 13B:
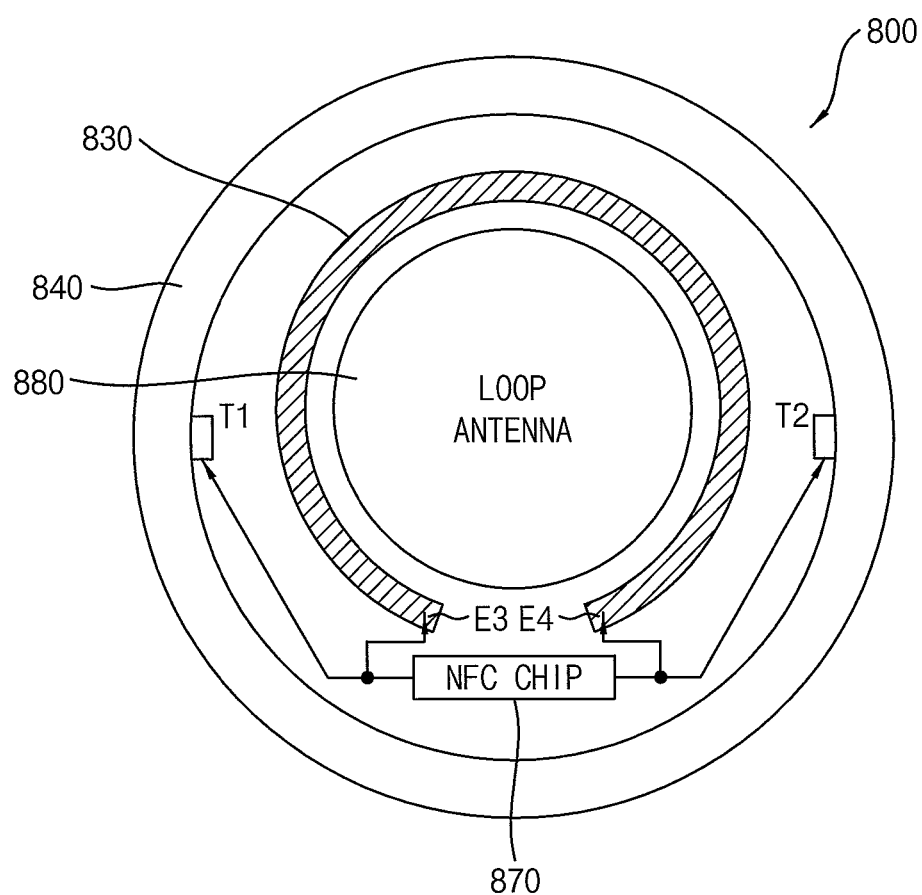
FIG. 13B is a diagram for describing a connection relationship among a case, a loop coil and a near field communication (NFC) chip.

FIG. 13A is a diagram for describing a configuration of a portable device according to some example embodiments, and FIG. 13B is a diagram for describing a connection relationship among a case, a loop coil and a near field communication (NFC) chip.

Referring to FIGS. 13A and 13B, compared with a portable device 200 illustrated in FIG. 2, a portable device 800 may further include a loop coil 830 surrounding a loop antenna 880.

A case 840 may have first and second terminals T1 and T2 spaced apart from each other, and an NFC chip 870 may be connected to the first and second terminals T1 and T2 of the case 840. The NFC chip 870 may provide an electrical signal to the first and second terminals T1 and T2 of the case 840, and the electrical signal (e.g., a current) may flow through a current path 850 of the case 840 between the first and second terminals T1 and T2. Accordingly, the case 840 may radiate a first magnetic field.

The loop coil 830 may be connected to the NFC chip 870 in parallel with the case 840. For example, one end E3 of the loop coil 830 may be connected to a terminal of the NFC chip 870 to which the first terminal T1 of the case 840 is connected, and the other end E4 of the loop coil 830 may be connected to a terminal of the NFC chip 870 to which the second terminal T2 of the case 840 is connected. Accordingly, the loop coil 830 may receive the electrical signal provided from the NFC chip 870, and may additionally radiate the first magnetic field based on the electrical signal, which results in strengthening the first magnetic field provided to the loop antenna 880. In response to the first magnetic field radiated by the case 840 and the loop coil 830, a current may flow through a current path 890 in the loop antenna 880, and thus the loop antenna 880 may radiate a second magnetic field.

As described above, in the portable device 800 according to some example embodiments, the loop coil 830 magnetically coupled to the NFC chip 870 in parallel with the case 840 may be located to surround the loop antenna 880, and thus the first magnetic field may be sufficiently provided to the loop antenna 880 by the loop coil 830. Accordingly, even if the loop antenna 880 is distant from the case 840, or even if the case 840 has low magnetic field radiation efficiency, the first magnetic field may be sufficiently provided to the loop antenna 880, and the portable device 800 may accurately perform the near field communication.

Figure 14:
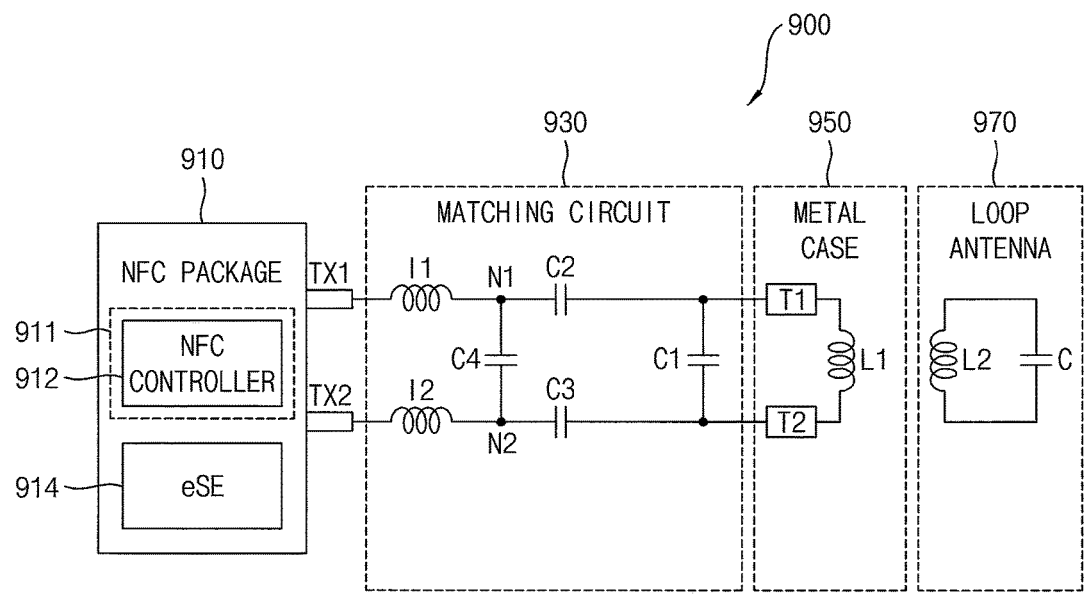
FIG. 14 is a diagram for describing an example of a connection relationship among an NFC chip, a matching circuit, a case and a loop antenna in a portable device according to some example embodiments.

FIG. 14 is a diagram for describing an example of a connection relationship among an NFC chip, a matching circuit, a case and a loop antenna in a portable device according to some example embodiments.

Referring to FIG. 14, a portable device 900 according to some example embodiments may include a display panel, a case (e.g., a metal case) 950 that supports the display panel and has first and second terminals T1 and T2 spaced apart from each other, and a loop antenna 970 located inside the case 950. The loop antenna 970 may be spaced apart from the case 950, and, may be magnetically coupled to the case 950. Further, an NFC package 910 may be embedded in the portable device 900.

The NFC package 910 may include an NFC chip 911 having an NFC controller 912 that performs a near field communication by providing an electrical signal to the case (e.g., the metal case) 950. The NFC controller 912 may be connected to at least one of first and second terminals T1 and T2 of the case 950, and may apply the electrical signal to the at least one of first and second terminals T1 and T2 of the case 950. Accordingly, the case 950 may radiate a first magnetic field based on the electrical signal, and the loop antenna 970 magnetically coupled to the case 950 may form a second magnetic field in response to the first magnetic field. In some example embodiments, the NFC package 910 may operate in an NFC card mode. In the NFC card mode, the NFC controller 912 may perform a transmitting operation and/or a receiving operation through a first transmission terminal TX1 and a second transmission terminal TX2. In other example embodiments, the NFC package 910 may operate in an NFC reader mode, and may have terminals for transmitting/receiving electrical signal for the NFC reader mode.

In some example embodiments, the NFC package 910 may further include a secure storage device 914 connected to the NFC controller 912. The secure storage device 914 may store information to be transferred to an external device through the near field communication using the first and second magnetic fields. For example, the secure storage device 914 may store payment information (e.g., credit card information), an encryption key, etc. In some example embodiments, the secure storage device 914 may be an embedded secure element (eSE). In some example embodiments, the NFC controller 912 and the secure storage device 914 may be packaged as one chip 910 using a system in package (SIP) technique.

In some example embodiments, the case 950 may be a metal case formed of a metal material. The case 950 may have the first and second terminals T1 and T2 spaced apart from each other. The case 950 may be represented by an inductor as an equivalent circuit.

In some example embodiments, a matching circuit 930 may be connected between the NFC package 910 and the case 950 of the portable device 900. The matching circuit 930 may perform impedance matching between the NFC package 910 and the case 950. For example, the matching circuit 930 may include a first capacitor C1, a second capacitor C2, a third capacitor C3, a fourth capacitor C4, a first inductor 11 and a second inductor 12. The first capacitor C1 may be connected between the first and second terminals T1 and T2 of the case 950. The first capacitor C1 may have an appropriate capacitance such that the case 950 represented by the inductor L1 may have a desired resonance frequency (e.g., about 13.56 MHz). The second capacitor C2 may be connected between the first terminal T1 of the case 950 and a first node N1, a third capacitor C3 may be connected between the second terminal T2 of the case 950 and a second node N2, and the fourth capacitor C4 may be connected between the first node N1 and the second node N2. The first inductor 11 may be connected between the first node N1 and the first transmission terminal TX1 of the NFC package 910, and the second inductor 12 may be connected between the second node N2 and the second transmission terminal TX2 of the NFC package 910. However, this configuration of the matching circuit 930 illustrated in FIG. 14 is only one example, and the matching circuit 930 for impedance matching between the NFC chip 930 and the case 950 may have various configurations according to some example embodiments.

In some example embodiments, the NFC package 910 (or the NFC controller 912) may output a differential electrical signal through the first and second transmission terminals TX1 and TX2, and the first and second terminals T1 and T2 of the case 950 may receive the differential electrical signal through the matching circuit 930. The case 950 may radiate the first magnetic field based on the differential electrical signal. The loop antenna 970 located inside the case 950 may be magnetically coupled to the case 950, and may be represented, as an equivalent circuit, by an inductor L2 and a capacitor C that are connected to each other. Since the loop antenna 970 is magnetically coupled to the case 950, the loop antenna 970 may form the second magnetic field in response to the first magnetic field radiated at the case 950. Accordingly, magnetic field efficiency of the portable device 900 may be improved, and the portable device 900 may accurately perform the near field communication.

Figure 15:
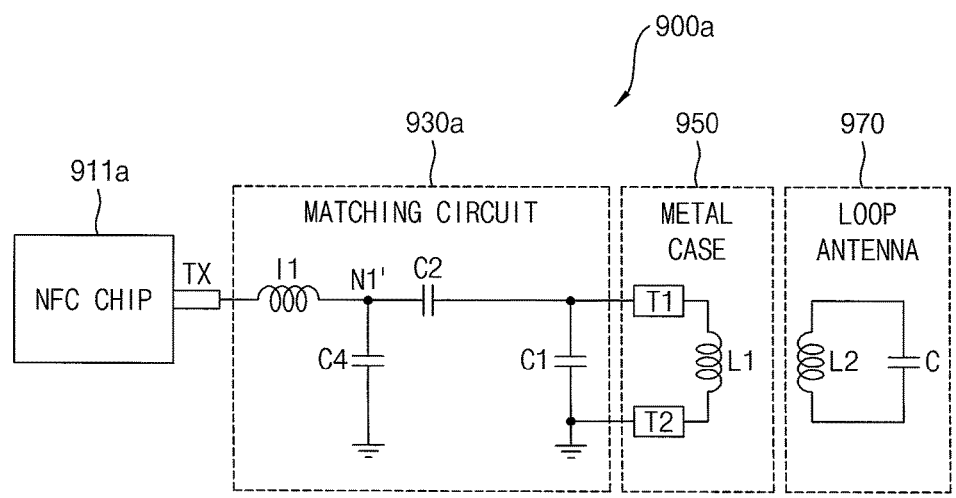
FIG. 15 is a diagram for describing another example of a connection relationship among an NFC chip, a matching circuit, a case and a loop antenna in a portable device according to some example embodiments.

FIG. 15 is a diagram for describing another example of a connection relationship among an NFC chip, a matching circuit, a case and a loop antenna in a portable device according to some example embodiments.

Referring to FIG. 15, in a portable device 900a, a matching circuit 930a may be connected between an NFC chip 911a and a case (e.g., a metal case) 950 of the portable device 900a. The matching circuit 930 may include a first capacitor C1 connected between first and second terminals T1 and T2 of the case 950, a second capacitor C2 connected between the first terminal T1 of the case 950 and a first node N1', a fourth capacitor C4 connected between the first node and a ground voltage, and a first inductor 11 connected between the N1' first node and at least one transmission terminal TX of the NFC chip 911a. The portable device 900a may have a similar configuration to a portable device 900 of FIG. 14, except that the NFC chip 911a outputs a single-ended electrical signal and the case 950 receives the single-ended electrical signal.

The NFC chip 911a may output the single-ended electrical signal through at least one transmission terminal TX, and one of the first and second terminals T1 and T2 of the case 950 may receive the single-ended electrical signal through the matching circuit 930a. The other of the first and second terminals T1 and T2 of the case 950 may be grounded. The case 950 may radiate a first magnetic field based on the single-ended electrical signal. A loop antenna 970 located inside the case 950 may be magnetically coupled to the case 950, and may form a second magnetic field in response to the first magnetic field radiated at the case 950.

Figure 16:
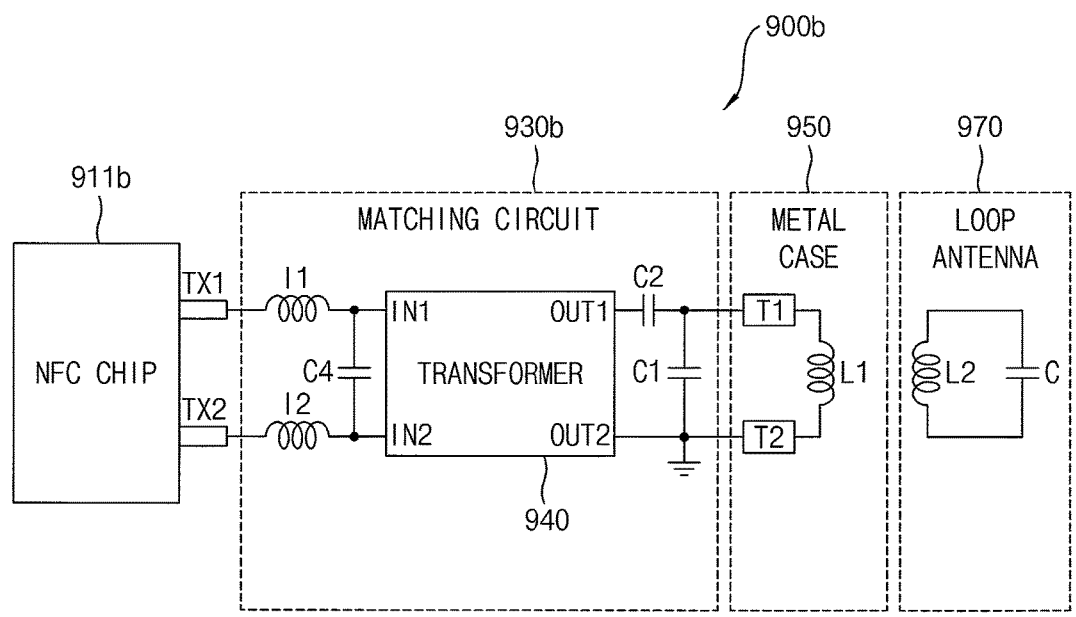
FIG. 16 is a diagram for describing still another example of a connection relationship among an NFC chip, a matching circuit, a case and a loop antenna in a portable device according to some example embodiments.

FIG. 16 is a diagram for describing still another example of a connection relationship among an NFC chip, a matching circuit, a case and a loop antenna in a portable device according to some example embodiments.

Referring to FIG. 16, a portable device 900b according to some example embodiments may include a display panel, an NFC chip 911b that outputs a differential electrical signal, a matching circuit 930b connected to the NFC chip 911b, a case (e.g., a metal case) 950 that supports the display panel and is connected to the matching circuit 930b, and a loop antenna 970 located inside the case 950. The loop antenna 970 may be spaced apart from the case 950, and, however, may be magnetically coupled to the case 950. The case 950 may include a conductive material. For example, the case 950 may be the metal case 950 including a metal material. The case 950 may have a first terminal T1 connected to the matching circuit 930b and a second terminal T2 spaced apart from the first terminal T1 and connected to a ground voltage.

The matching circuit 930b may be connected between the NFC chip 911b and the case 950 of the portable device 900b, and may perform impedance matching between the NFC chip 911b and the case 950. Further, the matching circuit 930b may receive the differential electrical signal from the NFC chip 911b, may convert the differential electrical signal into a single-ended electrical signal, and may transfer the single-ended electrical signal to the case 950. In some example embodiments, to convert the differential electrical signal into the single-ended electrical signal, the matching circuit 930b may include a transformer 940 for converting the differential electrical signal into the single-ended electrical signal. The transformer 940 may have first and second input terminals IN1 and IN2 respectively connected to first and second transmission terminals TX1 and TX2 of the NFC chip 911b, a first output terminal OUT1 connected to the first terminal T1 of the case 950, and a second output terminal OUT2 connected to the ground voltage. For example, the transformer 940 may be a balun (balanced-to-unbalanced) circuit or a balun transformer.

In some example embodiments, the matching circuit 930b may include a first capacitor C1 connected between the first terminal T1 of the case 950 and the ground voltage, a second capacitor C2 connected between the first terminal T1 of the case 950 and the first output terminal OUT1 of the transformer 940, a fourth capacitor C4 connected between the first and second input terminals IN1 and IN2 of the transformer 940, a first inductor 11 connected between the first input terminal IN1 of the transformer 940 and the first transmission terminal TX1 of the NFC chip 911b, and a second inductor 12 connected between the second input terminal IN2 of the transformer 940 and the second transmission terminal TX2 of the NFC chip 911b. The configurations and connections of the capacitors C1, C2 and C4 and the inductors 11 and 12 included in the matching circuit 930b may be changed or modified according to some example embodiments.

The NFC chip 911b may output the differential electrical signal through the first and second transmission terminals TX1 and TX2, and the differential electrical signal may be converted into the single-ended electrical signal by the transformer 940. One (e.g., the first terminal T1) of the first and second terminals T1 and T2 of the case 950 may receive the single-ended electrical signal from the transformer 940. The other (e.g., the second terminal T2) of the first and second terminals T1 and T2 of the case 950 may be grounded. The case 950 may radiate a first magnetic field based on the single-ended electrical signal. The loop antenna 970 located inside the case 950 may be magnetically coupled to the case 950, and may form a second magnetic field in response to the first magnetic field radiated at the case 950.

As described above, in the portable device 900b according to some example embodiments, the differential electrical signal output from the NFC chip 911b may be converted into the single-ended electrical signal by the matching circuit 930b or the transformer 910, and the single-ended electrical signal may be provided to the case 950. Thus, in a case where the NFC chip 911b outputs the differential electrical signal and, the matching circuit 930b is not readily connected to both terminals T1 and T2 of the case 950, or in a case where it is not easy to form two feeding points at the case 950, the portable device 900b can radiate the first magnetic field using the case 950.

Further, the loop antenna 970 magnetically coupled to the case 950 may radiate the second magnetic field in response to the first magnetic field, thereby improving magnetic field radiation efficiency of the portable device 900b.

Figure 17:
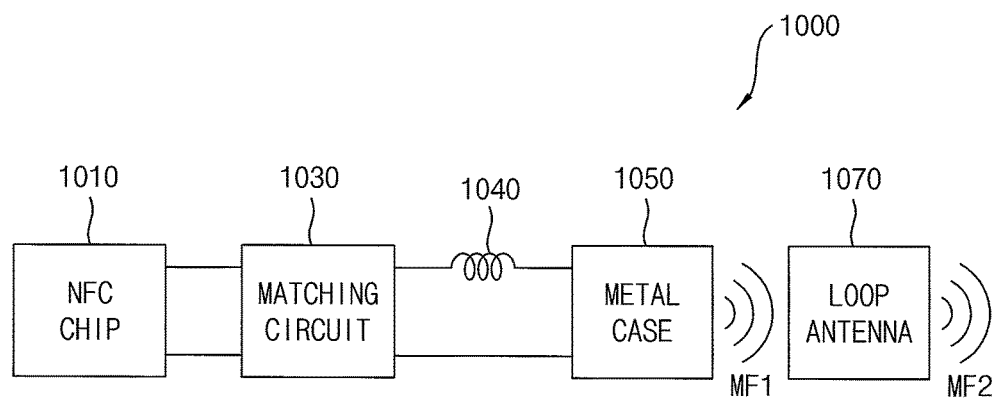
FIG. 17 is a diagram for describing a portable device including an inductor between a matching circuit and a case according to some example embodiments.

FIG. 17 is a diagram for describing a portable device including an inductor between a matching circuit and a case according to some example embodiments.

Referring to FIG. 17, in a portable device 1000, a matching circuit 1030 may be connected between an NFC chip 1010 and a case 1050 of the portable device 1000, and at least one inductor 1040 may be connected between the matching circuit 1030 and at least one terminal of the case 1050.

The case 1050 may radiate a first magnetic field MF1, and a loop antenna 1070 magnetically coupled to the case 1050 may radiate a second magnetic field MF2 in response to the first magnetic field MF1. Compared with a portable device 900 of FIG. 14, the portable device 1000 may further include at least one inductor 1040.

The inductor 1040 may located within a current loop formed by the case 1050 and a first capacitor C1 illustrated in FIG. 14. The inductor 1040 may block a signal component having a frequency that is different from an operating frequency (e.g., about 13.56 MHz) of NFC in the current loop. Accordingly, the inductor 1040 may allow the near field communication not to interfere with another wireless communication (e.g., a cellular telephone communication, such as a long term evolution (LTE) communication, a wideband code division multiple access (WCDMA) communication, etc., a wireless local area network (WLAN) communication, a global positioning system (GPS) communication, a Bluetooth communication, or the like) using the case 1050.

Figure 18:
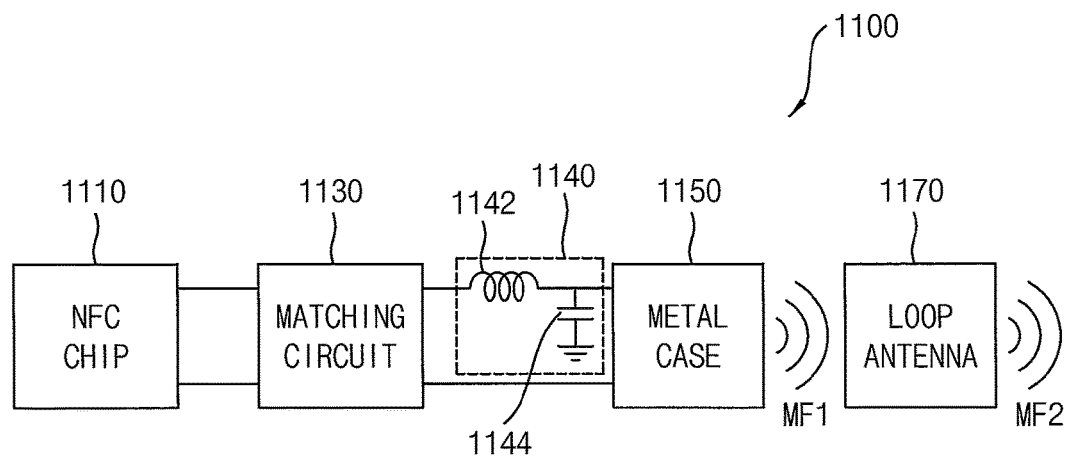
FIG. 18 is a diagram for describing a portable device including a low pass filter between a matching circuit and a case according to some example embodiments.

FIG. 18 is a diagram for describing a portable device including a low pass filter between a matching circuit and a case according to some example embodiments.

Referring to FIG. 18, in a portable device 1100, a matching circuit 1130 may be connected between an NFC chip 1110 and a case 1150 of the portable device 1100, and at least one low pass filter 1140 may be connected between the matching circuit 1130 and at least one terminal of the case 1150. The case 1150 may radiate a first magnetic field MF1, and a loop antenna 1170 magnetically coupled to the case 1150 may radiate a second magnetic field MF2 in response to the first magnetic field MF1. Compared with a portable device 1000 of FIG. 17, the portable device 1100 may include at least one low pass filter 1140 instead of an inductor 1040 illustrated in FIG. 17.

The low pass filter 1140 may located within a current loop formed by the case 1150 and a first capacitor C1 illustrated in FIG. 14. The low pass filter 1140 may block a signal component having a frequency that is different from an operating frequency (e.g., about 13.56 MHz) of NFC in the current loop. Accordingly, the low pass filter 1140 may allow the near field communication not to interfere with another wireless communication using the case 1150. For example, the low pass filter 1140 may include an inductor 1142 and a capacitor 1144.

Figure 19:
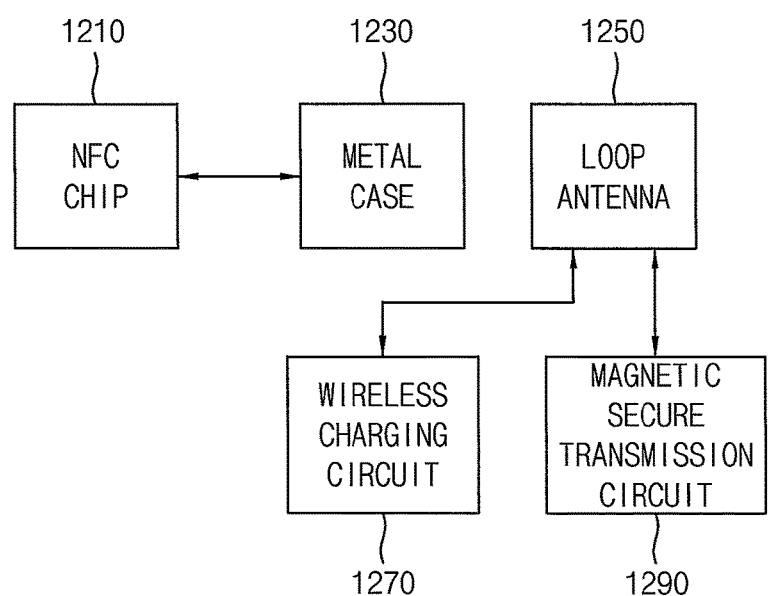
FIG. 19 is a diagram for describing a portable device that performs a near field communication, wireless charging, and/or a magnetic secure transmission according to some example embodiments.

FIG. 19 is a diagram for describing a portable device that performs a near field communication, wireless charging, and/or a magnetic secure transmission according to some example embodiments.

Referring to FIG. 19, a portable device according to some example embodiments may include an NFC chip 1210, a case (or a metal case) 1230 connected to the NFC chip 1210, and a loop antenna 1250 magnetically coupled to the case 1230. The NFC chip 1210 may perform a near field communication using the case 1230 and the loop antenna 1250.

In some example embodiments, the portable device may further include a wireless charging circuit 1270 connected to the loop antenna 1250. The wireless charging circuit 1270 may be wirelessly supplied with power through the loop antenna 1250, and thus may charge the supplied power for the portable device. Thus, the loop antenna 1250 may be used not only for the near field communication, but also for wireless charging.

In some example embodiments, the portable device may further include a magnetic secure transmission (MST) circuit 1290 connected to the loop antenna 1250. The MST circuit 1290 may perform a magnetic secure transmission using the loop antenna 1250. Thus, the loop antenna 1250 may be used not only for the near field communication, but also for the magnetic secure transmission.

Figure 20:
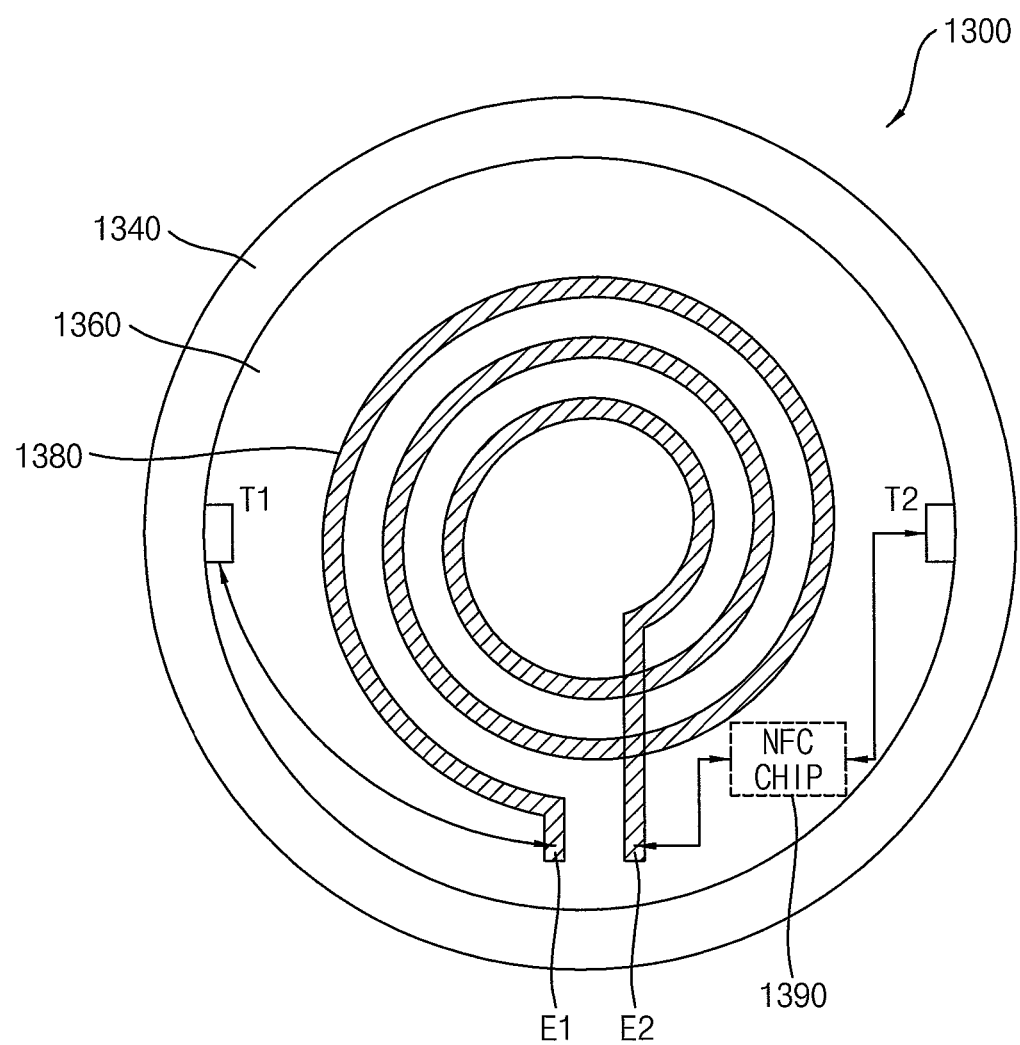
FIG. 20 is a diagram for describing a configuration of a portable device according to some example embodiments.

FIG. 20 is a diagram for describing a configuration of a portable device according to some example embodiments.

Referring to FIG. 20, in a portable device 1300, a case 1340 defining an internal space and a loop antenna 1380 located in the internal space may be connected in series. For example, a first terminal T1 of the case 1340 may be connected to a first end E1 of the loop antenna 1380 (or a loop coil), and an NFC chip 1390 may be connected to a second terminal T2 of the case 1340 and a second end E2 of the loop antenna 1380. Thus, in an NFC antenna including the case 1340 and the loop antenna 1380, the second terminal T2 of the case 1340 and the second end E2 of the loop antenna 1380 may serve as feeding points for the NFC antenna. The NFC chip 1390 may perform a near field communication using the case 1340 and the loop antenna 1380 that are connected in series. In some example embodiments, the case 1340 may have a unitary structure with no slit, and thus a waterproof function and an aesthetic impression of the case 1340 may be improved.

Figure 21:
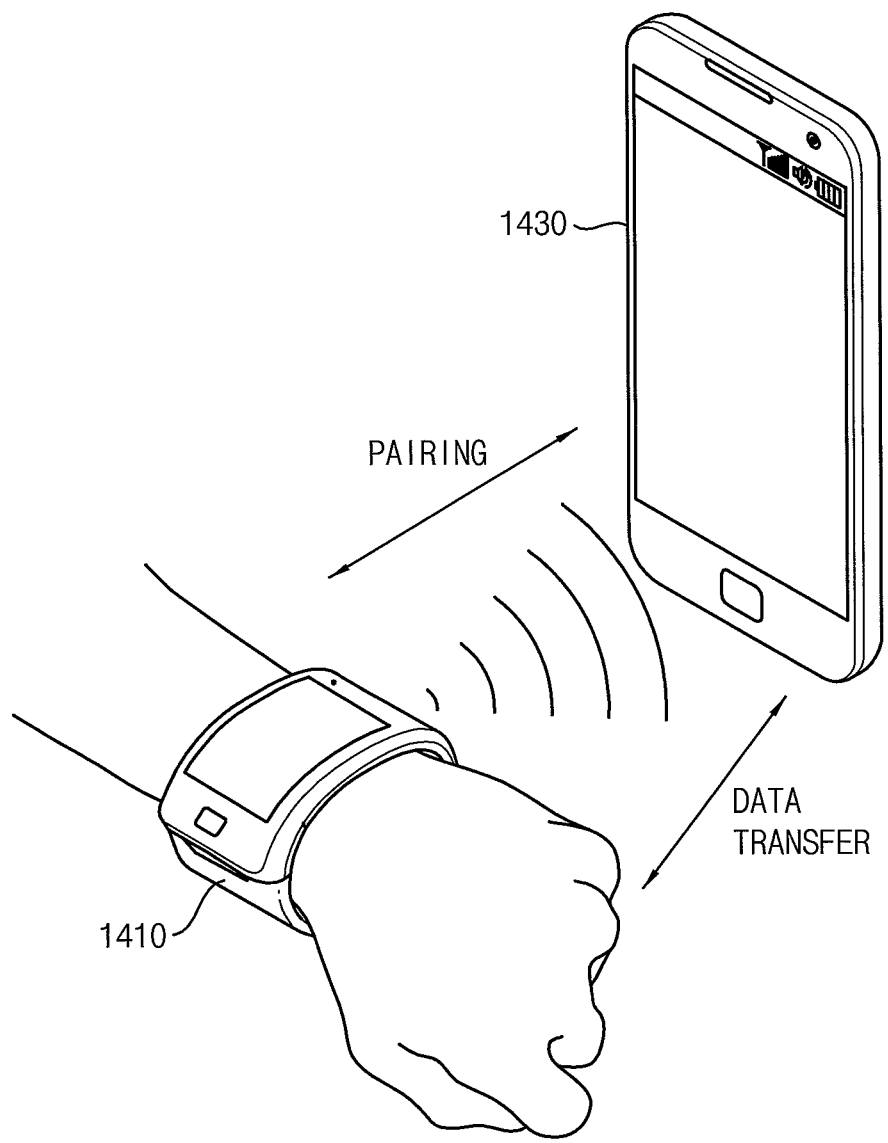
FIG. 21 is a diagram for describing an example of a portable device performing a near field communication according to some example embodiments.
Figure 22:
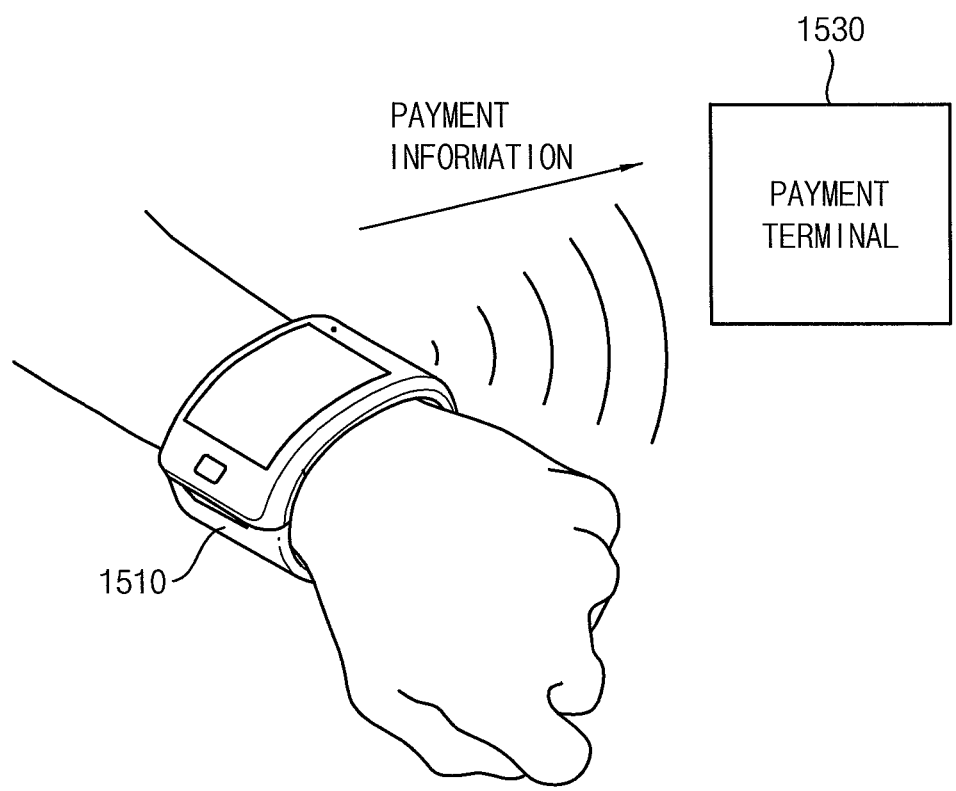
FIG. 22 is a diagram for describing another example of a portable device performing a near field communication according to some example embodiments.

FIG. 21 is a diagram for describing an example of a portable device performing a near field communication according to some example embodiments, and FIG. 22 is a diagram for describing another example of a portable device performing a near field communication according to some example embodiments.

As illustrated in FIG. 21, a portable device 1410 according to some example embodiments may be a wearable electronic device 1410, such as a wrist-worn electronic device. The wearable electronic device 1410 may perform pairing or a data transfer with an external wireless communication device 1430 through a near field communication while the wearable electronic device 1410 is being worn. For example, the wearable electronic device 1410 may perform the pairing with the external wireless communication device 1430 to perform another wireless communication (e.g., a Bluetooth or a Wi-Fi).

By the pairing, the wearable electronic device 1410 and the wireless communication device 1430 may be paired or bonded by sharing a shared key (or a link key). According to some example embodiments, the wearable electronic device 1410 may perform the data transfer with the wireless communication device 1430 through the near field communication, or may perform the data transfer with the wireless communication device 1430 through the wireless communication (e.g., the Bluetooth or the Wi-Fi) paired through the near field communication.

As illustrated in FIG. 22, a portable device 1510 according to some example embodiments may be a wearable electronic device 1510, such as a wrist-worn electronic device. The wearable electronic device 1510 may perform an electronic payment by transferring payment information (e.g., credit card information) to a payment terminal 1530 through a near field communication while the wearable electronic device 1510 is being worn.

The portable device 1410 and 1510 illustrated in FIGS. 21 and 22 according to some example embodiments may perform the pairing, the data transfer, the electronic payment, etc. through the near field communication using a case of the portable device 1410 and 1510 and a loop antenna that are magnetically coupled to each other. In the portable device 1410 and 1510 according to some example embodiments, no slit may be formed at the case, and thus a waterproof function and an aesthetic impression of the case may be improved. In some example embodiments, the portable device 1410 and 1510 may be the wearable electronic device 1410 and 1510, and the wearable electronic device 1410 and 1510 may perform the pairing, the data transfer, the electronic payment, etc. through the near field communication while the wearable electronic device 1410 and 1510 is being worn.

The inventive concepts may be applied to any portable device, such as a smart phone, a tablet computer, or a wearable electronic device, such as a smart watch, a wrist band electronic device, a necklace type electronic device, a glasses type electronic device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concepts. For example, the antenna may be coated with a resin or other material such as in the example embodiments shown in FIGS. 8, 10 and 12.

Accordingly, all such modifications are intended to be included within the scope of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An antenna arrangement comprising:
a primary antenna having a conductive sidewall, the conductive sidewall including at least two terminals and not including a slit;
a loop antenna in and physically separated from the primary antenna, the loop antenna including a first conductive loop and a capacitor electrically connected between ends of the first conductive loop; and
a second conductive loop around the loop antenna, a first end of the second conductive loop connected to a first terminal of a near field communication (NFC) chip to which a first terminal of the two terminals is connected, and a second end of the second conductive loop connected to a second terminal of the NFC chip to which a second terminal of the two terminals is connected.

2. The antenna arrangement of claim 1, wherein the first conductive loop is a coil.

3. The antenna arrangement of claim 2, wherein the coil has a circular spiral shape.

4. The antenna arrangement of claim 1, wherein the loop antenna has at least a first layer and a second layer, and the first and second layers are electrically connected.

5. A portable device, comprising:
a near field communication (NFC) chip;
a case configured to generate a first magnetic field based on an electrical signal from the NFC chip, the case including a conductive sidewall, the conductive sidewall including at least two terminals and not including a slit;
a loop antenna physically separated from the NFC chip and the case, and the loop antenna configured to magnetically couple to the case such that the loop antenna forms a second magnetic field in response to the first magnetic field; and
a second conductive loop around the loop antenna, a first end of the second conductive loop connected to a first terminal of the NFC chip to which a first terminal of the two terminals is connected, and a second end of the second conductive loop connected to a second terminal of the NFC chip to which a second terminal of the two terminals is connected.

6. The portable device of claim 5, further comprising:
a secure storage device configured to store information, wherein the NFC chip is configured to generate the electrical signal such that the first and second magnetic fields represent the stored information.

7. The portable device of claim 5, further comprising:
a matching circuit configured to match impedances of the NFC chip and the case.

8. The portable device of claim 7, wherein
the matching circuit is configured to convert a differential electrical signal from the NFC chip to a single-ended electrical signal.

9. The portable device of claim 7, wherein
the NFC chip is configured to output a first single-ended electrical signal; and
the matching circuit is configured to output a second single-ended electrical signal.

10. A portable device, comprising:
a case including a conductive material, the case having at least two terminals and a sidewall of the case not including a slit;
a near field communication (NFC) device electrically connected to the two terminals of the case, the NFC device configured to provide an electrical signal to the case such that the case radiates a first magnetic field based on the electrical signal; and
a loop antenna disposed inside the case, the loop antenna configured to magnetically couple to the case such that the loop antenna forms a second magnetic field in response to the first magnetic field; and
a second conductive loop around the loop antenna, a first end of the second conductive loop connected to a first terminal of the NFC device to which a first terminal of the two terminals is connected, and a second end of the second conductive loop connected to a second terminal of the NFC device to which a second terminal of the two terminals is connected.

11. The portable device of claim 10, wherein the second terminal is grounded.

12. The portable device of claim 11, wherein the case has a circular profile and the second terminal is disposed 120 degrees from the first terminal on the case.

13. The portable device of claim 10, further comprising:
a display panel connected at a top of the case;
a main board inside the case; and
a processor on the main board, the processor configured to control an operation of the portable device,
wherein the loop antenna is between the display panel and the main board.

14. The portable device of claim 13, wherein the loop antenna is configured to radiate the second magnetic field in a direction passing through the display panel.

15. The portable device of claim 13, further comprising:
a magnetic sheet between the loop antenna and the main board.

16. The antenna arrangement of claim 1, wherein
two terminals included in the conductive sidewall are at opposite sides of the primary antenna, respectively, and
the two terminals are near a straight line bisecting an internal space of the primary antenna.

* * * * *